(12) United States Patent
Saksonov et al.

(10) Patent No.: US 10,373,182 B2
(45) Date of Patent: Aug. 6, 2019

(54) SYSTEMS AND METHODS FOR GEOGRAPHICAL TICKER OF HEALTH RELATED SAVINGS ACCOUNT TRANSACTIONS

(71) Applicant: ALEGEUS TECHNOLOGIES, LLC, Waltham, MA (US)

(72) Inventors: Eugene Saksonov, Andover, MA (US); Steven Auerbach, Boston, MA (US)

(73) Assignee: ALEGEUS TECHNOLOGIES, LLC, Waltham, MA (US)

( * ) Notice: Subject to any disclaimer, the term of this patent is extended or adjusted under 35 U.S.C. 154(b) by 903 days.

(21) Appl. No.: 14/617,128

(22) Filed: Feb. 9, 2015

(65) Prior Publication Data
US 2016/0232635 A1 Aug. 11, 2016

(51) Int. Cl.
*G06Q 30/02* (2012.01)
*G06Q 20/40* (2012.01)
*G06F 9/46* (2006.01)

(52) U.S. Cl.
CPC ......... *G06Q 30/0205* (2013.01); *G06F 9/466* (2013.01); *G06Q 20/4016* (2013.01)

(58) Field of Classification Search
CPC .................. G06Q 20/4016; G06Q 30/0205
See application file for complete search history.

(56) References Cited

U.S. PATENT DOCUMENTS

| | | | |
|---|---|---|---|
| 2007/0268313 A1* | 11/2007 | Dolph | G06F 3/04817 345/635 |
| 2012/0094639 A1* | 4/2012 | Carlson | H04W 4/028 455/414.1 |
| 2013/0268340 A1* | 10/2013 | Colon | G06Q 40/08 705/14.25 |

* cited by examiner

*Primary Examiner* — Sheetal R Paulson
(74) *Attorney, Agent, or Firm* — Foley & Lardner LLP; Christopher J. McKenna

(57) ABSTRACT

Systems and method of the present disclosure are directed to providing a geographical ticker of financial transactions. A mapping engine on a server receives a first set of transaction data within a first predetermined time window from a database that includes a monetary amount of a transaction and an entity at which each transaction. The mapping engine obtains a location of the entity for each transaction and displays, on a digital map and in a first time sequence corresponding to the first predetermined time window, an icon at each location for each transaction. The mapping engine displays, on the digital map and in one or more time sequences corresponding to one or more predetermined time windows subsequent to the first predetermined time window, an icon at each location for each transaction within one or more sets of transaction data corresponding to the one or more predetermined time windows.

18 Claims, 11 Drawing Sheets

SYSTEMS AND METHODS FOR GEOGRAPHICAL TICKER OF HEALTH RELATED SAVINGS ACCOUNT TRANSACTIONS

FIELD OF THE DISCLOSURE

The present solution is generally directed to providing a geographic ticker of financial transactions. In particular, the present solution generates an icon for a flexible spending account purchase transaction that occurred at an entity, and display the icon at a location on a geographic map.

BACKGROUND OF THE DISCLOSURE

Companies or health insurance provides may establish flexible spending accounts for individuals such as employees or subscribers, which may provide a tax advantage. The individual may transfer or allocate funds to the flexible spending account. The individuals may purchase qualifying items at a merchant using funds in their flexible spending account in order take advantage of tax savings. As individuals increasingly utilize flexible spending accounts to make purchases at various merchants' locations, it may be challenging for a provider or administrator of the flexible spending account to monitor the transactions in order to improve aspects or benefits associated with the flexible spending account.

BRIEF SUMMARY OF THE DISCLOSURE

Systems and methods of the present solution are directed to providing a geographic ticker of financial transactions. In some embodiments, the present solution can map a dollar amount of a transaction made using tax benefit account such as a flexible spending account ("FSA"), Healthcare Savings Account ("HSA"), Dependent Care Account ("DCA"), Transport Account (e.g., for parking or monthly passes). A user can make the transaction at an entity such as a merchant, pharmacy, retail store, medical supply store, or other entity that provides goods or services that are deemed to be qualified expenses in accordance with the tax benefit account. The transaction can occur via a point-of-sale terminal or device located at the merchant. The point-of-sale terminal can be configured to receive financial transaction information from the user (e.g., via a card swipe) and communicate with one or more servers or databases to authenticate the financial transaction information, identify a corresponding tax benefit account of the user, and initiate or facilitate the transfer of funds from the tax benefit account to the entity. The transaction can be associated with information such as a time stamp, entity identifier, and transaction amount. This information can be provided in real-time to a transaction repository.

The present solution can obtain the transaction information from a repository and plot the transaction information on a geographical map. For example, the present solution can obtain, from the transaction repository, a set of transaction data for a set of transactions that occurred during a time period. The present solution can identify a location for each transaction in the set of transactions based on an entity identifier of the transaction. Upon identifying the location, the present solution can generate an icon for each transaction and plot the icon on a geographic map in accordance with the identified location. In some cases, the present solution is configured with an offset technique that facilitates plotting each icon on a map without obfuscating or overlaying one icon over another icon. For example, the present solution can apply an offset (e.g., dynamically generated randomized offset) to the location of each transaction and plot the offset location on the map. The icon can include additional information about the transaction or entity, such as the transaction amount, merchant name, merchant identifier, time stamp, type of FSA, etc. The icon can be configured to display some or all of the additional information responsive to an interaction with the icon such as a mouse-over, click, gesture, or voice command. The additional information can be displayed via a popup window, window frame, in the icon, on a portion of a display area, in a ticker, or via text to speech.

The map can be updated in real-time, on a rolling basis, or based on a predetermined time window. For example, the system can obtain a set of transactions corresponding to the predetermined time window, normalize the transactions over the predetermined time window, and display an icon for each transaction of the set of transactions over a duration corresponding to the predetermined time window. In some instances, the system can remove an icon after it has been on display for the predetermined time window, and replace it with a subsequent transaction from a subsequent set of transactions corresponding to a subsequent predetermined time window.

At least one aspect of the present solution is directed to a method of providing a geographical ticker of financial transactions. The method can include a mapping engine executing on a server receiving, from a database, a first set of transaction data. The first set of transaction data is within a first predetermined time window and includes information identifying a monetary amount of a transaction and an entity at which each transaction occurred for a plurality of transactions that occurred during the first predetermined time window. The method can include the mapping engine obtaining each location of the entity for each transaction within the first set of transaction data. The method can include the mapping engine displaying an icon at each location for each transaction within the first set of transaction data. The mapping engine can display the icon at each location on a digital map in a first time sequence corresponding to the first predetermined time window. The method can include the mapping engine displaying, on the digital map and in one or more time sequences corresponding to one or more predetermined time windows subsequent to the first predetermined time window, an icon at each location for each transaction within one or more sets of transaction data corresponding to the one or more predetermined time windows.

In some embodiments, the method includes the mapping engine polling the database responsive to expiration of the first predetermined time window. The method can include the mapping engine receiving a second set of transaction data within a second predetermined time window subsequent to the first predetermined time window. The mapping engine can receive the second set of transaction data responsive to the polling.

In some embodiments, the method includes displaying each icon for a predetermined time period and removing each icon from the digital map upon expiration of the predetermined time period. In some embodiments, the first set of transaction data includes information identifying the monetary amount of each transaction and the entity of each transaction made at a corresponding plurality of point-of-sale devices using funds from one or more flexible spending accounts. In some embodiments, the method includes applying a different offset to each location for each transaction of the first set of transaction data. The method can include displaying, on the digital map, the icon at each offset location for each transaction of the first set of transaction data.

In some embodiments, at least two transactions of the first set of transaction data occurred via a same entity. In these embodiments, the method can include obtaining coordinates of a location of the same entity. The method can include applying a first offset to the coordinates to generate a first offset location for a first transaction of the at least two transactions. The method can include applying a second offset to the coordinates to generate a second offset location for a second transaction of the at least two transactions. The second offset location can be different from the first offset location. The method can include displaying, in the first time sequence corresponding to the first predetermined time window, a first icon at the first offset location and a second icon at the second offset location.

In some embodiments, obtaining each location of the entity can include obtaining coordinates of a predetermined location within a city. In some embodiments, the icon is configured to display, responsive to a trigger event, the monetary amount of the transaction and an identifier of the entity at which the transaction occurred.

In some embodiments, the method can include the server establishing a real-time communication link with a second server interfacing with a plurality of point-of-sale devices. The second server can be configured to receive the first set of transaction data in real-time from the plurality of point-of-sale devices. The method can include the server receiving the first set of transaction data responsive to the second server receiving the first set of transaction data from the plurality of point-of-sale devices. The method can include the server storing the first set of transaction data in the database.

In some embodiments, the method can include displaying on or adjacent to the digital map a running total of the monetary amount of each transaction of the first set of transaction data. In some embodiments, the method can include receiving, via a configuration screen, a base total monetary amount and a base total number of transactions. The method can include displaying on or adjacent to the digital map a running total of the monetary amount of each transaction of the first set of transaction data relative to the base total amount. The method can include displaying on or adjacent to the digital map a transaction number corresponding to the running total. The transaction number can be relative to the base total number of transactions.

Another aspect of the present solution is directed to a system that provides a geographical ticker of financial transactions. The system can include a mapping engine on a server. The system can include a database or be configured to access a database. The mapping engine can receive, from the database, a first set of transaction data within a first predetermined time window. The first set of transaction data includes information identifying a monetary amount of a transaction and an entity at which each transaction occurred for a plurality of transactions that occurred during the first predetermined time window. The mapping engine can obtain each location of the entity for each transaction within the first set of transaction data. The mapping engine can display, on a digital map and in a first time sequence corresponding to the first predetermined time window, an icon at each location for each transaction within the first set of transaction data. The mapping engine can display, on the digital map and in one or more time sequences corresponding to one or more predetermined time windows subsequent to the first predetermined time window, an icon at each location for each transaction within one or more sets of transaction data corresponding to the one or more predetermined time windows.

In some embodiments, the mapping engine can poll the database responsive to the first predetermined time window ending. The mapping engine can receive, responsive to the polling, a second set of transaction data within a second predetermined time window subsequent to the first predetermined time window. In some embodiments, the mapping engine can display each icon for a predetermined time period and remove each icon from the digital map upon expiration of the predetermined time period.

In some embodiments, the first set of transaction data includes information identifying the monetary amount of each transaction and the entity of each transaction made at a corresponding plurality of point-of-sale devices using funds from one or more flexible spending accounts. In some embodiments, the mapping engine can apply a different offset to each location for each transaction of the first set of transaction data. The mapping engine can display, on the digital map, the icon at each offset location for each transaction of the first set of transaction data.

In some embodiments, at least two transactions of the first set of transaction data occurred via a same entity. In these embodiments, the mapping engine can obtain coordinates of a location of the same entity. The mapping engine can apply a first offset to the coordinates to generate a first offset location for a first transaction of the at least two transactions. The mapping engine can apply a second offset to the coordinates to generate a second offset location for a second transaction of the at least two transactions. The second offset location can be different from the first offset location. The mapping engine can display, in the first time sequence corresponding to the first predetermined time window, a first icon at the first offset location and a second icon at the second offset location.

In some embodiments, the mapping engine or server can establish a real-time communication link with a second server interfacing with a plurality of point-of-sale devices. The second server can receive the first set of transaction data in real-time from the plurality of point-of-sale devices. The mapping engine or server can receive the first set of transaction data responsive to the second server receiving the first set of transaction data from the plurality of point-of-sale devices. The mapping engine or server can store the first set of transaction data in the database.

In some embodiments, the mapping engine can display on or adjacent to the digital map a running total of the monetary amount of each transaction of the first set of transaction data. In some embodiments, the mapping engine or server can receive, via a configuration screen, a base total monetary amount and a base total number of transactions. The mapping engine can display on or adjacent to the digital map a running total of the monetary amount of each transaction of the first set of transaction data relative to the base total amount. The mapping engine can display on or adjacent to the digital map a transaction number corresponding to the running total, the transaction number relative to the base total number of transactions.

Yet another aspect is directed to a non-transitory computer readable storage device that stores instructions that, when executed by one or more processors, provides a geographical ticker of financial transactions. The instructions can include instructions receive, from a database, a first set of transaction data within a first predetermined time window. The first set of transaction data includes information identifying a monetary amount of a transaction and an entity at which each transaction occurred for a plurality of transactions that occurred during the first predetermined time window. The instructions can include instructions to obtain each location of the entity for each transaction within the first set of transaction data. The instructions can include instructions to display, on a digital map and in a first time sequence corresponding to the first predetermined time window, an icon at each location for each transaction within the first set of transaction data. The instructions can include instructions to display, on the digital map and in one or more time sequences corresponding to one or more predetermined time windows subsequent to the first predetermined time window, an icon at each location for each transaction within one or more sets of transaction data corresponding to the one or more predetermined time windows.

BRIEF DESCRIPTION OF THE DRAWINGS

The foregoing and other objects, aspects, features, and advantages of the disclosure will become more apparent and better understood by referring to the following description taken in conjunction with the accompanying drawings, in which.

DETAILED DESCRIPTION

For purposes of reading the description of the various embodiments below, the following descriptions of the sections of the specification and their respective contents may be helpful:

Section A describes a network environment and computing environment which may be useful for practicing embodiments described herein.

Section B describes embodiments of systems and methods for a geographical ticker.

A. Computing and Network Environment

Figure 1A:
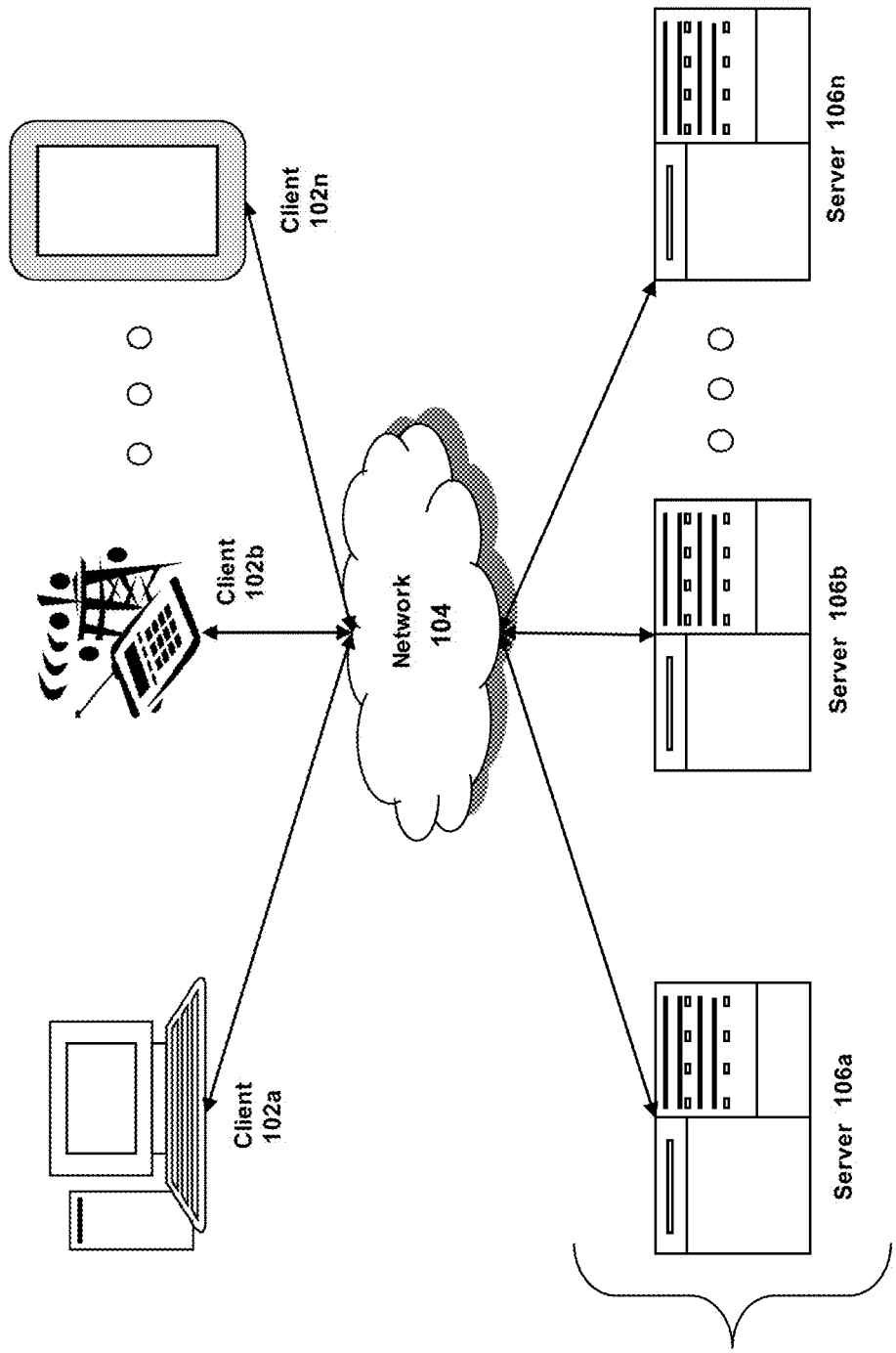
FIG. 1A is a block diagram depicting an embodiment of a network environment comprising client device in communication with server device.

Prior to discussing specific embodiments of the present solution, it may be helpful to describe aspects of the operating environment as well as associated system components (e.g., hardware elements) in connection with the methods and systems described herein. Referring to FIG. 1A, an embodiment of a network environment is depicted. In brief overview, the network environment includes one or more clients 102a-102n (also generally referred to as local machine(s) 102, client(s) 102, client node(s) 102, client machine(s) 102, client computer(s) 102, client device(s) 102, endpoint(s) 102, or endpoint node(s) 102) in communication with one or more servers 106a-106n (also generally referred to as server(s) 106, node 106, or remote machine(s) 106) via one or more networks 104. In some embodiments, a client 102 has the capacity to function as both a client node seeking access to resources provided by a server and as a server providing access to hosted resources for other clients 102a-102n.

Although FIG. 1A shows a network 104 between the clients 102 and the servers 106, the clients 102 and the servers 106 may be on the same network 104. In some embodiments, there are multiple networks 104 between the clients 102 and the servers 106. In one of these embodiments, a network 104' (not shown) may be a private network and a network 104 may be a public network. In another of these embodiments, a network 104 may be a private network and a network 104' a public network. In still another of these embodiments, networks 104 and 104' may both be private networks.

The network 104 may be connected via wired or wireless links. Wired links may include Digital Subscriber Line (DSL), coaxial cable lines, or optical fiber lines. The wireless links may include BLUETOOTH, Wi-Fi, Worldwide Interoperability for Microwave Access (WiMAX), an infrared channel or satellite band. The wireless links may also include any cellular network standards used to communicate among mobile devices, including standards that qualify as 1 G, 2G, 3G, or 4G. The network standards may qualify as one or more generation of mobile telecommunication standards by fulfilling a specification or standards such as the specifications maintained by International Telecommunication Union. The 3G standards, for example, may correspond to the International Mobile Telecommunications-2000 (IMT-2000) specification, and the 4G standards may correspond to the International Mobile Telecommunications Advanced (IMT-Advanced) specification. Examples of cellular network standards include AMPS, GSM, GPRS, UMTS, LTE, LTE Advanced, Mobile WiMAX, and WiMAX-Advanced. Cellular network standards may use various channel access methods e.g. FDMA, TDMA, CDMA, or SDMA. In some embodiments, different types of data may be transmitted via different links and standards. In other embodiments, the same types of data may be transmitted via different links and standards.

The network 104 may be any type and/or form of network. The geographical scope of the network 104 may vary widely and the network 104 can be a body area network (BAN), a personal area network (PAN), a local-area network (LAN), e.g. Intranet, a metropolitan area network (MAN), a wide area network (WAN), or the Internet. The topology of the network 104 may be of any form and may include, e.g., any of the following: point-to-point, bus, star, ring, mesh, or tree. The network 104 may be an overlay network which is virtual and sits on top of one or more layers of other networks 104'. The network 104 may be of any such network topology as known to those ordinarily skilled in the art capable of supporting the operations described herein. The network 104 may utilize different techniques and layers or stacks of protocols, including, e.g., the Ethernet protocol, the internet protocol suite (TCP/IP), the ATM (Asynchronous Transfer Mode) technique, the SONET (Synchronous Optical Networking) protocol, or the SDH (Synchronous Digital Hierarchy) protocol. The TCP/IP internet protocol suite may include application layer, transport layer, internet layer (including, e.g., IPv6), or the link layer. The network 104 may be a type of a broadcast network, a telecommunications network, a data communication network, or a computer network.

In some embodiments, the system may include multiple, logically-grouped servers 106. In one of these embodiments, the logical group of servers may be referred to as a server farm 38 or a machine farm 38. In another of these embodiments, the servers 106 may be geographically dispersed. In other embodiments, a machine farm 38 may be administered as a single entity. In still other embodiments, the machine farm 38 includes a plurality of machine farms 38. The servers 106 within each machine farm 38 can be heterogeneous—one or more of the servers 106 or machines 106 can operate according to one type of operating system platform (e.g., WINDOWS NT, manufactured by Microsoft Corp. of Redmond, Wash.), while one or more of the other servers 106 can operate on according to another type of operating system platform (e.g., Unix, Linux, or Mac OS X).

In one embodiment, servers 106 in the machine farm 38 may be stored in high-density rack systems, along with associated storage systems, and located in an enterprise data center. In this embodiment, consolidating the servers 106 in this way may improve system manageability, data security, the physical security of the system, and system performance by locating servers 106 and high performance storage systems on localized high performance networks. Centralizing the servers 106 and storage systems and coupling them with advanced system management tools allows more efficient use of server resources.

The servers 106 of each machine farm 38 do not need to be physically proximate to another server 106 in the same machine farm 38. Thus, the group of servers 106 logically grouped as a machine farm 38 may be interconnected using a wide-area network (WAN) connection or a metropolitan-area network (MAN) connection. For example, a machine farm 38 may include servers 106 physically located in different continents or different regions of a continent, country, state, city, campus, or room. Data transmission speeds between servers 106 in the machine farm 38 can be increased if the servers 106 are connected using a local-area network (LAN) connection or some form of direct connection. Additionally, a heterogeneous machine farm 38 may include one or more servers 106 operating according to a type of operating system, while one or more other servers 106 execute one or more types of hypervisors rather than operating systems. In these embodiments, hypervisors may be used to emulate virtual hardware, partition physical hardware, virtualize physical hardware, and execute virtual machines that provide access to computing environments, allowing multiple operating systems to run concurrently on a host computer. Native hypervisors may run directly on the host computer. Hypervisors may include VMware ESX/ESXi, manufactured by VMWare, Inc., of Palo Alto, Calif.; the Xen hypervisor, an open source product whose development is overseen by Citrix Systems, Inc.; the HYPER-V hypervisors provided by Microsoft or others. Hosted hypervisors may run within an operating system on a second software level. Examples of hosted hypervisors may include VMware Workstation and VIRTUALBOX.

Management of the machine farm 38 may be de-centralized. For example, one or more servers 106 may comprise components, subsystems and modules to support one or more management services for the machine farm 38. In one of these embodiments, one or more servers 106 provide functionality for management of dynamic data, including techniques for handling failover, data replication, and increasing the robustness of the machine farm 38. Each server 106 may communicate with a persistent store and, in some embodiments, with a dynamic store.

Server 106 may be a file server, application server, web server, proxy server, appliance, network appliance, gateway, gateway server, virtualization server, deployment server, SSL VPN server, or firewall. In one embodiment, the server 106 may be referred to as a remote machine or a node. In another embodiment, a plurality of nodes 290 may be in the path between any two communicating servers.

Figure 1B:
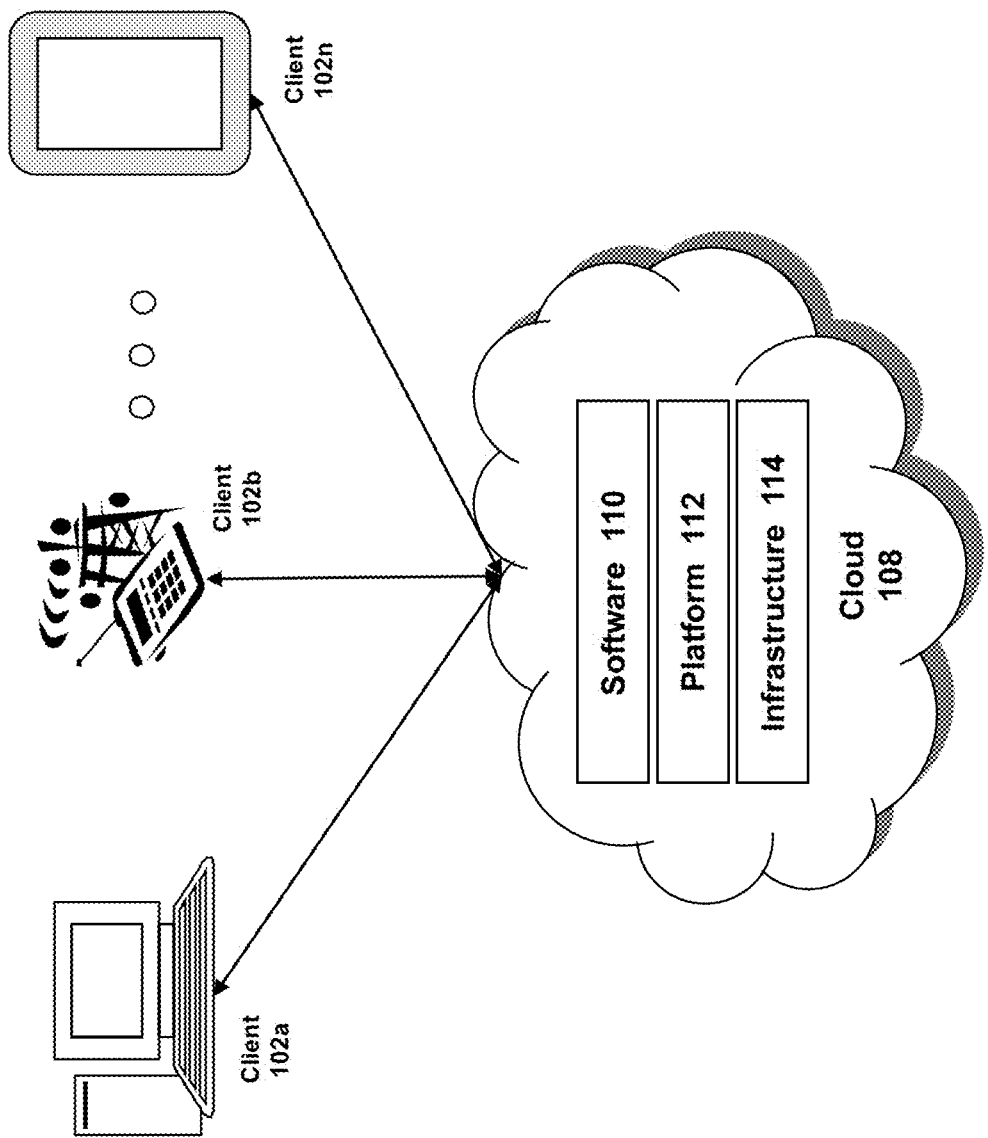
FIG. 1B is a block diagram depicting a cloud computing environment comprising client device in communication with cloud service providers.

Referring to FIG. 1B, a cloud computing environment is depicted. A cloud computing environment may provide client 102 with one or more resources provided by a network environment. The cloud computing environment may include one or more clients 102a-102n, in communication with the cloud 108 over one or more networks 104. Clients 102 may include, e.g., thick clients, thin clients, and zero clients. A thick client may provide at least some functionality even when disconnected from the cloud 108 or servers 106. A thin client or a zero client may depend on the connection to the cloud 108 or server 106 to provide functionality. A zero client may depend on the cloud 108 or other networks 104 or servers 106 to retrieve operating system data for the client device. The cloud 108 may include back end platforms, e.g., servers 106, storage, server farms or data centers.

The cloud 108 may be public, private, or hybrid. Public clouds may include public servers 106 that are maintained by third parties to the clients 102 or the owners of the clients. The servers 106 may be located off-site in remote geographical locations as disclosed above or otherwise. Public clouds may be connected to the servers 106 over a public network. Private clouds may include private servers 106 that are physically maintained by clients 102 or owners of clients. Private clouds may be connected to the servers 106 over a private network 104. Hybrid clouds 108 may include both the private and public networks 104 and servers 106.

The cloud 108 may also include a cloud based delivery, e.g. Software as a Service (SaaS) 110, Platform as a Service (PaaS) 112, and Infrastructure as a Service (IaaS) 114. IaaS may refer to a user renting the use of infrastructure resources that are needed during a specified time period. IaaS providers may offer storage, networking, servers or virtualization resources from large pools, allowing the users to quickly scale up by accessing more resources as needed. Examples of IaaS can include infrastructure and services (e.g., EG-32) provided by OVH HOSTING of Montreal, Quebec, Canada, AMAZON WEB SERVICES provided by Amazon.com, Inc., of Seattle, Wash., RACKSPACE CLOUD provided by Rackspace US, Inc., of San Antonio, Tex., Google Compute Engine provided by Google Inc. of Mountain View, Calif., or RIGHTSCALE provided by RightScale, Inc., of Santa Barbara, Calif. PaaS providers may offer functionality provided by IaaS, including, e.g., storage, networking, servers or virtualization, as well as additional resources such as, e.g., the operating system, middleware, or runtime resources. Examples of PaaS include WINDOWS AZURE provided by Microsoft Corporation of Redmond, Wash., Google App Engine provided by Google Inc., and HEROKU provided by Heroku, Inc. of San Francisco, Calif. SaaS providers may offer the resources that PaaS provides, including storage, networking, servers, virtualization, operating system, middleware, or runtime resources. In some embodiments, SaaS providers may offer additional resources including, e.g., data and application resources. Examples of SaaS include GOOGLE APPS provided by Google Inc., SALESFORCE provided by Salesforce.com Inc. of San Francisco, Calif., or OFFICE 365 provided by Microsoft Corporation. Examples of SaaS may also include data storage providers, e.g. DROPBOX provided by Dropbox, Inc. of San Francisco, Calif., Microsoft SKYDRIVE provided by Microsoft Corporation, Google Drive provided by Google Inc., or Apple ICLOUD provided by Apple Inc. of Cupertino, Calif.

Clients 102 may access IaaS resources with one or more IaaS standards, including, e.g., Amazon Elastic Compute Cloud (EC2), Open Cloud Computing Interface (OCCI), Cloud Infrastructure Management Interface (CIMI), or OpenStack standards. Some IaaS standards may allow clients access to resources over HTTP, and may use Representational State Transfer (REST) protocol or Simple Object Access Protocol (SOAP). Clients 102 may access PaaS resources with different PaaS interfaces. Some PaaS interfaces use HTTP packages, standard Java APIs, JavaMail API, Java Data Objects (JDO), Java Persistence API (JPA), Python APIs, web integration APIs for different programming languages including, e.g., Rack for Ruby, WSGI for Python, or PSGI for Perl, or other APIs that may be built on REST, HTTP, XML, or other protocols. Clients 102 may access SaaS resources through the use of web-based user interfaces, provided by a web browser (e.g. GOOGLE CHROME, Microsoft INTERNET EXPLORER, or Mozilla Firefox provided by Mozilla Foundation of Mountain View, Calif.). Clients 102 may also access SaaS resources through smartphone or tablet applications, including, e.g., Salesforce Sales Cloud, or Google Drive app. Clients 102 may also access SaaS resources through the client operating system, including, e.g., Windows file system for DROPBOX.

In some embodiments, access to IaaS, PaaS, or SaaS resources may be authenticated. For example, a server or authentication server may authenticate a user via security certificates, HTTPS, or API keys. API keys may include various encryption standards such as, e.g., Advanced Encryption Standard (AES). Data resources may be sent over Transport Layer Security (TLS) or Secure Sockets Layer (SSL).

Figure 1C:
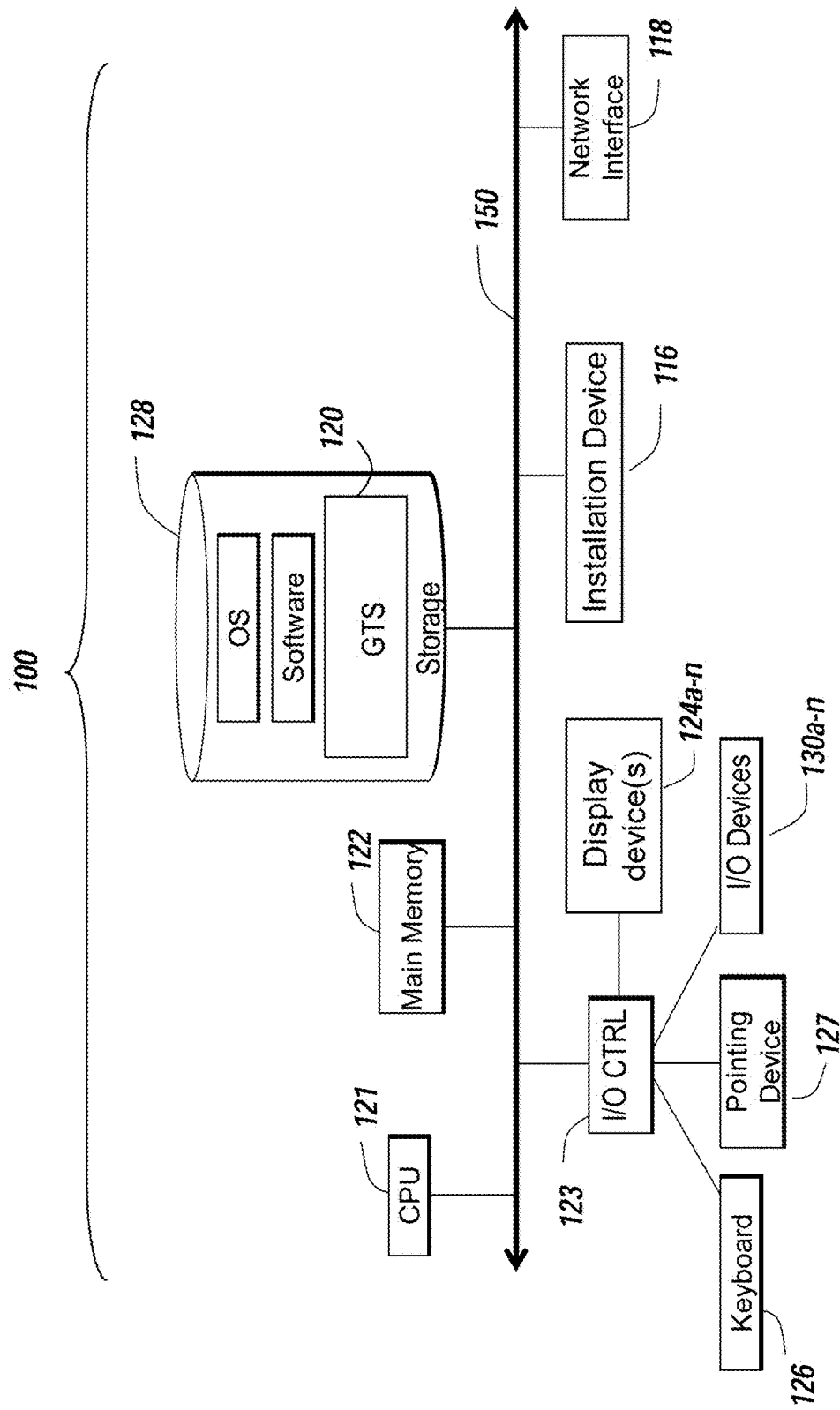
FIGS. 1C and 1D are block diagrams depicting embodiments of computing devices useful in connection with the methods and systems described herein.
Figure 1D:
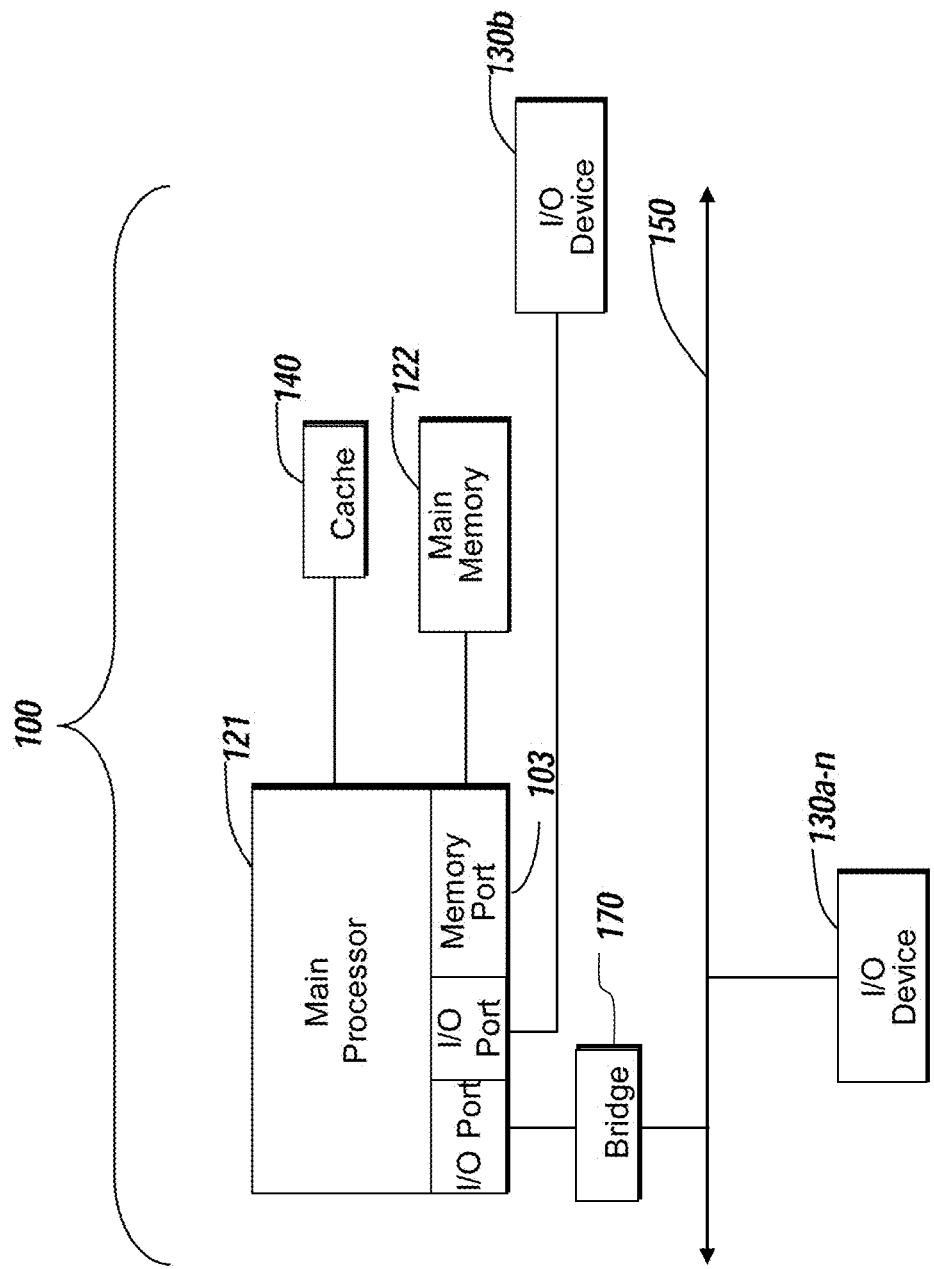

The client 102 and server 106 may be deployed as and/or executed on any type and form of computing device, e.g. a computer, network device or appliance capable of communicating on any type and form of network and performing the operations described herein. FIGS. 1C and 1D depict block diagrams of a computing device 100 useful for practicing an embodiment of the client 102 or a server 106. As shown in FIGS. 1C and 1D, each computing device 100 includes a central processing unit 121, and a main memory unit 122. As shown in FIG. 1C, a computing device 100 may include a storage device 128, an installation device 116, a network interface 118, an I/O controller 123, display devices 124a-124n, a keyboard 126 and a pointing device 127, e.g. a mouse. The storage device 128 may include, without limitation, an operating system, software, and a software of a geographical ticker system (GTS) 120. As shown in FIG. 1D, each computing device 100 may also include additional optional elements, e.g. a memory port 103, a bridge 170, one or more input/output devices 130a-130n (generally referred to using reference numeral 130), and a cache memory 140 in communication with the central processing unit 121.

The central processing unit 121 is any logic circuitry that responds to and processes instructions fetched from the main memory unit 122. In many embodiments, the central processing unit 121 is provided by a microprocessor unit, e.g.: those manufactured by Intel Corporation of Mountain View, Calif.; those manufactured by Motorola Corporation of Schaumburg, Ill.; the ARM processor and TEGRA system on a chip (SoC) manufactured by Nvidia of Santa Clara, Calif.; the POWER7 processor, those manufactured by International Business Machines of White Plains, N.Y.; or those manufactured by Advanced Micro Devices of Sunnyvale, Calif. The computing device 100 may be based on any of these processors, or any other processor capable of operating as described herein. The central processing unit 121 may utilize instruction level parallelism, thread level parallelism, different levels of cache, and multi-core processors. A multi-core processor may include two or more processing units on a single computing component. Examples of multi-core processors include the AMD PHENOM IIX2, INTEL CORE i5 and INTEL CORE i7.

Main memory unit 122 may include one or more memory chips capable of storing data and allowing any storage location to be directly accessed by the microprocessor 121. Main memory unit 122 may be volatile and faster than storage 128 memory. Main memory units 122 may be Dynamic random access memory (DRAM) or any variants, including static random access memory (SRAM), Burst SRAM or SynchBurst SRAM (BSRAM), Fast Page Mode DRAM (FPM DRAM), Enhanced DRAM (EDRAM), Extended Data Output RAM (EDO RAM), Extended Data Output DRAM (EDO DRAM), Burst Extended Data Output DRAM (BEDO DRAM), Single Data Rate Synchronous DRAM (SDR SDRAM), Double Data Rate SDRAM (DDR SDRAM), Direct Rambus DRAM (DRDRAM), or Extreme Data Rate DRAM (XDR DRAM). In some embodiments, the main memory 122 or the storage 128 may be non-volatile; e.g., non-volatile read access memory (NVRAM), flash memory non-volatile static RAM (nvSRAM), Ferroelectric RAM (FeRAM), Magnetoresistive RAM (MRAM), Phase-change memory (PRAM), conductive-bridging RAM (CBRAM), Silicon-Oxide-Nitride-Oxide-Silicon (SONOS), Resistive RAM (RRAM), Racetrack, Nano-RAM (NRAM), or Millipede memory. The main memory 122 may be based on any of the above described memory chips, or any other available memory chips capable of operating as described herein. In the embodiment shown in FIG. 1C, the processor 121 communicates with main memory 122 via a system bus 150 (described in more detail below). FIG. 1D depicts an embodiment of a computing device 100 in which the processor communicates directly with main memory 122 via a memory port 103. For example, in FIG. 1D the main memory 122 may be DRDRAM.

FIG. 1D depicts an embodiment in which the main processor 121 communicates directly with cache memory 140 via a secondary bus, sometimes referred to as a backside bus. In other embodiments, the main processor 121 communicates with cache memory 140 using the system bus 150. Cache memory 140 typically has a faster response time than main memory 122 and is typically provided by SRAM, BSRAM, or EDRAM. In the embodiment shown in FIG. 1D, the processor 121 communicates with various I/O devices 130 via a local system bus 150. Various buses may be used to connect the central processing unit 121 to any of the I/O devices 130, including a PCI bus, a PCI-X bus, or a PCI-Express bus, or a NuBus. For embodiments in which the I/O device is a video display 124, the processor 121 may use an Advanced Graphics Port (AGP) to communicate with the display 124 or the I/O controller 123 for the display 124. FIG. 1D depicts an embodiment of a computer 100 in which the main processor 121 communicates directly with I/O device 130b or other processors 121' via HYPERTRANSPORT, RAPIDIO, or INFINIBAND communications technology. FIG. 1D also depicts an embodiment in which local busses and direct communication are mixed: the processor 121 communicates with I/O device 130a using a local interconnect bus while communicating with I/O device 130b directly.

A wide variety of I/O devices 130a-130n may be present in the computing device 100. Input devices may include keyboards, mice, trackpads, trackballs, touchpads, touch mice, multi-touch touchpads and touch mice, microphones, multi-array microphones, drawing tablets, cameras, single-lens reflex camera (SLR), digital SLR (DSLR), CMOS sensors, accelerometers, infrared optical sensors, pressure sensors, magnetometer sensors, angular rate sensors, depth sensors, proximity sensors, ambient light sensors, gyroscopic sensors, or other sensors. Output devices may include video displays, graphical displays, speakers, headphones, inkjet printers, laser printers, and 3D printers.

Devices 130a-130n may include a combination of multiple input or output devices, including, e.g., Microsoft KINECT, Nintendo Wiimote for the WII, Nintendo WII U GAMEPAD, or Apple IPHONE. Some devices 130a-130n allow gesture recognition inputs through combining some of the inputs and outputs. Some devices 130a-130n provides for facial recognition which may be utilized as an input for different purposes including authentication and other commands. Some devices 130a-130n provides for voice recognition and inputs, including, e.g., Microsoft KINECT, SIRI for IPHONE by Apple, Google Now or Google Voice Search.

Additional devices 130a-130n have both input and output capabilities, including, e.g., haptic feedback devices, touchscreen displays, or multi-touch displays. Touchscreen, multi-touch displays, touchpads, touch mice, or other touch sensing devices may use different technologies to sense touch, including, e.g., capacitive, surface capacitive, projected capacitive touch (PCT), in-cell capacitive, resistive, infrared, waveguide, dispersive signal touch (DST), in-cell optical, surface acoustic wave (SAW), bending wave touch (BWT), or force-based sensing technologies. Some multi-touch devices may allow two or more contact points with the surface, allowing advanced functionality including, e.g., pinch, spread, rotate, scroll, or other gestures. Some touchscreen devices, including, e.g., Microsoft PIXELSENSE or Multi-Touch Collaboration Wall, may have larger surfaces, such as on a table-top or on a wall, and may also interact with other electronic devices. Some I/O devices 130a-130n, display devices 124a-124n or group of devices may be augment reality devices. The I/O devices may be controlled by an I/O controller 123 as shown in FIG. 1C. The I/O controller may control one or more I/O devices, such as, e.g., a keyboard 126 and a pointing device 127, e.g., a mouse or optical pen. Furthermore, an I/O device may also provide storage and/or an installation medium 116 for the computing device 100. In still other embodiments, the computing device 100 may provide USB connections (not shown) to receive handheld USB storage devices. In further embodiments, an I/O device 130 may be a bridge between the system bus 150 and an external communication bus, e.g. a USB bus, a SCSI bus, a FireWire bus, an Ethernet bus, a Gigabit Ethernet bus, a Fibre Channel bus, or a Thunderbolt bus.

In some embodiments, display devices 124a-124n may be connected to I/O controller 123. Display devices may include, e.g., liquid crystal displays (LCD), thin film transistor LCD (TFT-LCD), blue phase LCD, electronic papers (e-ink) displays, flexile displays, light emitting diode displays (LED), digital light processing (DLP) displays, liquid crystal on silicon (LCOS) displays, organic light-emitting diode (OLED) displays, active-matrix organic light-emitting diode (AMOLED) displays, liquid crystal laser displays, time-multiplexed optical shutter (TMOS) displays, or 3D displays. Examples of 3D displays may use, e.g. stereoscopy, polarization filters, active shutters, or autostereoscopy. Display devices 124a-124n may also be a head-mounted display (HMD). In some embodiments, display devices 124a-124n or the corresponding I/O controllers 123 may be controlled through or have hardware support for OPENGL or DIRECTX API or other graphics libraries.

In some embodiments, the computing device 100 may include or connect to multiple display devices 124a-124n, which each may be of the same or different type and/or form. As such, any of the I/O devices 130a-130n and/or the I/O controller 123 may include any type and/or form of suitable hardware, software, or combination of hardware and software to support, enable or provide for the connection and use of multiple display devices 124a-124n by the computing device 100. For example, the computing device 100 may include any type and/or form of video adapter, video card, driver, and/or library to interface, communicate, connect or otherwise use the display devices 124a-124n. In one embodiment, a video adapter may include multiple connectors to interface to multiple display devices 124a-124n. In other embodiments, the computing device 100 may include multiple video adapters, with each video adapter connected to one or more of the display devices 124a-124n. In some embodiments, any portion of the operating system of the computing device 100 may be configured for using multiple displays 124a-124n. In other embodiments, one or more of the display devices 124a-124n may be provided by one or more other computing devices 100a or 100b connected to the computing device 100, via the network 104. In some embodiments software may be designed and constructed to use another computer's display device as a second display device 124a for the computing device 100. For example, in one embodiment, an Apple iPad may connect to a computing device 100 and use the display of the device 100 as an additional display screen that may be used as an extended desktop. One ordinarily skilled in the art will recognize and appreciate the various ways and embodiments that a computing device 100 may be configured to have multiple display devices 124a-124n.

Referring again to FIG. 1C, the computing device 100 may comprise a storage device 128 (e.g. one or more hard disk drives or redundant arrays of independent disks) for storing an operating system or other related software, and for storing application software programs such as any program related to the software 120 for the geographical ticker system. Examples of storage device 128 include, e.g., hard disk drive (HDD); optical drive including CD drive, DVD drive, or BLU-RAY drive; solid-state drive (SSD); USB flash drive; or any other device suitable for storing data. Some storage devices may include multiple volatile and non-volatile memories, including, e.g., solid state hybrid drives that combine hard disks with solid state cache. Some storage device 128 may be non-volatile, mutable, or read-only. Some storage device 128 may be internal and connect to the computing device 100 via a bus 150. Some storage device 128 may be external and connect to the computing device 100 via a I/O device 130 that provides an external bus. Some storage device 128 may connect to the computing device 100 via the network interface 118 over a network 104, including, e.g., the Remote Disk for MACBOOK AIR by Apple. Some client devices 100 may not require a non-volatile storage device 128 and may be thin clients or zero clients 102. Some storage device 128 may also be used as an installation device 116, and may be suitable for installing software and programs. Additionally, the operating system and the software can be run from a bootable medium, for example, a bootable CD, e.g. KNOPPIX, a bootable CD for GNU/Linux that is available as a GNU/Linux distribution from knoppix.net.

Client device 100 may also install software or application from an application distribution platform. Examples of application distribution platforms include the App Store for iOS provided by Apple, Inc., the Mac App Store provided by Apple, Inc., GOOGLE PLAY for Android OS provided by Google Inc., Chrome Webstore for CHROME OS provided by Google Inc., and Amazon Appstore for Android OS and KINDLE FIRE provided by Amazon.com, Inc. An application distribution platform may facilitate installation of software on a client device 102. An application distribution platform may include a repository of applications on a server 106 or a cloud 108, which the clients 102a-102n may access over a network 104. An application distribution platform may include application developed and provided by various developers. A user of a client device 102 may select, purchase and/or download an application via the application distribution platform.

Furthermore, the computing device 100 may include a network interface 118 to interface to the network 104 through a variety of connections including, but not limited to, standard telephone lines LAN or WAN links (e.g., 802.11, T1, T3, Gigabit Ethernet, Infiniband), broadband connections (e.g., ISDN, Frame Relay, ATM, Gigabit Ethernet, Ethernet-over-SONET, ADSL, VDSL, BPON, GPON, fiber optical including FiOS), wireless connections, or some combination of any or all of the above. Connections can be established using a variety of communication protocols (e.g., TCP/IP, Ethernet, ARCNET, SONET, SDH, Fiber Distributed Data Interface (FDDI), IEEE 802.11a/b/g/n/ac CDMA, GSM, WiMax and direct asynchronous connections). In one embodiment, the computing device 100 communicates with other computing devices 100' via any type and/or form of gateway or tunneling protocol e.g. Secure Socket Layer (SSL) or Transport Layer Security (TLS), or the Citrix Gateway Protocol manufactured by Citrix Systems, Inc. of Ft. Lauderdale, Fla. The network interface 118 may comprise a built-in network adapter, network interface card, PCMCIA network card, EXPRESSCARD network card, card bus network adapter, wireless network adapter, USB network adapter, modem or any other device suitable for interfacing the computing device 100 to any type of network capable of communication and performing the operations described herein.

A computing device 100 of the sort depicted in FIGS. 1B and 1C may operate under the control of an operating system, which controls scheduling of tasks and access to system resources. The computing device 100 can be running any operating system such as any of the versions of the MICROSOFT WINDOWS operating systems, the different releases of the Unix and Linux operating systems, any version of the MAC OS for Macintosh computers, any embedded operating system, any real-time operating system, any open source operating system, any proprietary operating system, any operating systems for mobile computing devices, or any other operating system capable of running on the computing device and performing the operations described herein. Typical operating systems include, but are not limited to: WINDOWS 2000, WINDOWS Server 2012, WINDOWS CE, WINDOWS Phone, WINDOWS XP, WINDOWS VISTA, and WINDOWS 7, WINDOWS RT, and WINDOWS 8 all of which are manufactured by Microsoft Corporation of Redmond, Wash.; MAC OS and iOS, manufactured by Apple, Inc. of Cupertino, Calif.; and Linux, a freely-available operating system, e.g. Linux Mint distribution ("distro") or Ubuntu, distributed by Canonical Ltd. of London, United Kingdom; or Unix or other Unix-like derivative operating systems; and Android, designed by Google, of Mountain View, Calif., among others. Some operating systems, including, e.g., the CHROME OS by Google, may be used on zero clients or thin clients, including, e.g., CHROMEBOOKS.

The computer system 100 can be any workstation, telephone, desktop computer, laptop or notebook computer, netbook, ULTRABOOK, tablet, server, handheld computer, mobile telephone, smartphone or other portable telecommunications device, media playing device, a gaming system, mobile computing device, or any other type and/or form of computing, telecommunications or media device that is capable of communication. The computer system 100 has sufficient processor power and memory capacity to perform the operations described herein. In some embodiments, the computing device 100 may have different processors, operating systems, and input devices consistent with the device. The Samsung GALAXY smartphones, e.g., operate under the control of Android operating system developed by Google, Inc. GALAXY smartphones receive input via a touch interface.

In some embodiments, the computing device 100 is a gaming system. For example, the computer system 100 may comprise a PLAYSTATION 3, or PERSONAL PLAYSTATION PORTABLE (PSP), or a PLAYSTATION VITA device manufactured by the Sony Corporation of Tokyo, Japan, a NINTENDO DS, NINTENDO 3DS, NINTENDO WII, or a NINTENDO WII U device manufactured by Nintendo Co., Ltd., of Kyoto, Japan, an XBOX 360 device manufactured by the Microsoft Corporation of Redmond, Wash.

In some embodiments, the computing device 100 is a digital audio player such as the Apple IPOD, IPOD Touch, and IPOD NANO lines of devices, manufactured by Apple Computer of Cupertino, Calif. Some digital audio players may have other functionality, including, e.g., a gaming system or any functionality made available by an application from a digital application distribution platform. For example, the IPOD Touch may access the Apple App Store. In some embodiments, the computing device 100 is a portable media player or digital audio player supporting file formats including, but not limited to, MP3, WAV, M4A/AAC, WMA Protected AAC, RIFF, Audible audiobook, Apple Lossless audio file formats and .mov, .m4v, and .mp4 MPEG-4 (H.264/MPEG-4 AVC) video file formats.

In some embodiments, the computing device 100 is a tablet e.g. the IPAD line of devices by Apple; GALAXY TAB family of devices by Samsung; or KINDLE FIRE, by Amazon.com, Inc. of Seattle, Wash. In other embodiments, the computing device 100 is an eBook reader, e.g. the KINDLE family of devices by Amazon.com, or NOOK family of devices by Barnes & Noble, Inc. of New York City, N.Y.

In some embodiments, the communications device 102 includes a combination of devices, e.g. a smartphone combined with a digital audio player or portable media player. For example, one of these embodiments is a smartphone, e.g. the IPHONE family of smartphones manufactured by Apple, Inc.; a Samsung GALAXY family of smartphones manufactured by Samsung, Inc.; or a Motorola DROID family of smartphones. In yet another embodiment, the communications device 102 is a laptop or desktop computer equipped with a web browser and a microphone and speaker system, e.g. a telephony headset. In these embodiments, the communications devices 102 are web-enabled and can receive and initiate phone calls. In some embodiments, a laptop or desktop computer is also equipped with a webcam or other video capture device that enables video chat and video call.

In some embodiments, the status of one or more machines 102, 106 in the network 104 are monitored, generally as part of network management. In one of these embodiments, the status of a machine may include an identification of load information (e.g., the number of processes on the machine, CPU and memory utilization), of port information (e.g., the number of available communication ports and the port addresses), or of session status (e.g., the duration and type of processes, and whether a process is active or idle). In another of these embodiments, this information may be identified by a plurality of metrics, and the plurality of metrics can be applied at least in part towards decisions in load distribution, network traffic management, and network failure recovery as well as any aspects of operations of the present solution described herein. Aspects of the operating environments and components described above will become apparent in the context of the systems and methods disclosed herein.

B. Geographical Ticker System

Systems and methods of the present solution are directed to providing a geographic ticker of financial transactions. Systems and methods of the present solution can provide a geographic ticker of financial transactions made using a tax benefit account such as a flexible spending account ("FSA"), Dependent Care Account ("DCA"), Transport Account (e.g., for parking or monthly passes). In some embodiments, the present solution can map, in real-time, a dollar amount of a transaction made at a point of sale terminal using a flexible spending account ("FSA"). A flexible spending account, or flexible spending arrangement, can refer to a tax-advantaged financial account that can be set up through a cafeteria plan of an employer and used to set aside a portion of earnings to pay for qualified expenses as established in the cafeteria plan. Types of FSA can include medical expense FSA, health FSA, health savings account (HSA), health reimbursement account (HRA), health reimbursement plan (HRP), etc. Qualified expenses can include, for example, medical expenses, dependent care, dental expenses, vision expenses, parking, monthly passes, etc. An FSA may be tax-advantaged because funds deducted from an employee's account and transferred to the FSA is not subject to payroll taxes, resulting in payroll tax savings.

A user can make the transaction at an entity such as a merchant, pharmacy, retail store, medical supply store, or other entity that provides goods or services that are deemed to be qualified expenses in accordance with the tax benefit account or FSA. The transaction can occur via a point-of-sale terminal or device (e.g., checkout device, electronic point of sale device or other device that includes hardware and software to facilitate a transaction) configured to receive financial transaction information from the user (e.g., via a debit card, pin number, mobile payment device, near field communication-enabled device, mobile telecommunications device) and communicate with one or more servers or databases to authenticate the financial transaction information, identify a corresponding FSA of the user, and initiate or facilitate the transfer of funds from the FSA to the entity. The transaction can be associated with information such as an FSA account identifier, time stamp, entity identifier, and transaction amount. This information can be provided in real-time to a transaction repository.

The present solution can obtain the transaction information from a repository and plot the transaction information on a geographical map. For example, the present solution can obtain, from the transaction repository, a set of transaction data for a set of transactions that occurred during a time period. The present solution can identify a location for each transaction in the set of transactions based on an entity identifier of the transaction. Upon identifying the location, the present solution can generate an icon for each transaction and plot the icon on a geographic map in accordance with the identified location. In some cases, the present solution is configured with an offset technique that facilitates plotting each icon on a map without obfuscating or overlaying one icon over another icon. For example, the present solution can apply an offset (e.g., dynamically generated randomized offset) to the location of each transaction and plot the offset location on the map. The icon can include additional information about the transaction or entity, such as the transaction amount, merchant name, merchant identifier, time stamp, type of FSA, etc. The icon can be configured to display some or all of the additional information responsive to an interaction with the icon such as a mouse-over, click, gesture, or voice command. The additional information can be displayed via a popup window, window frame, in the icon, on a portion of a display area, in a ticker, or via text to speech.

The map can be updated in real-time, on a rolling basis, or based on a predetermined time window (e.g., 5 minutes, 10 minutes, 15 minutes, or a predetermined time window that falls within the range of about 1 minute to about 30 minutes). For example, the system can obtain a set of transactions corresponding to the predetermined time window, normalize the transactions over the predetermined time window, and display an icon for each transaction of the set of transactions over a duration corresponding to the predetermined time window. In some instances, the system can remove an icon after it has been on display for the predetermined time window, and replace it with a subsequent transaction from a subsequent set of transactions corresponding to a subsequent predetermined time window.

Figure 2:
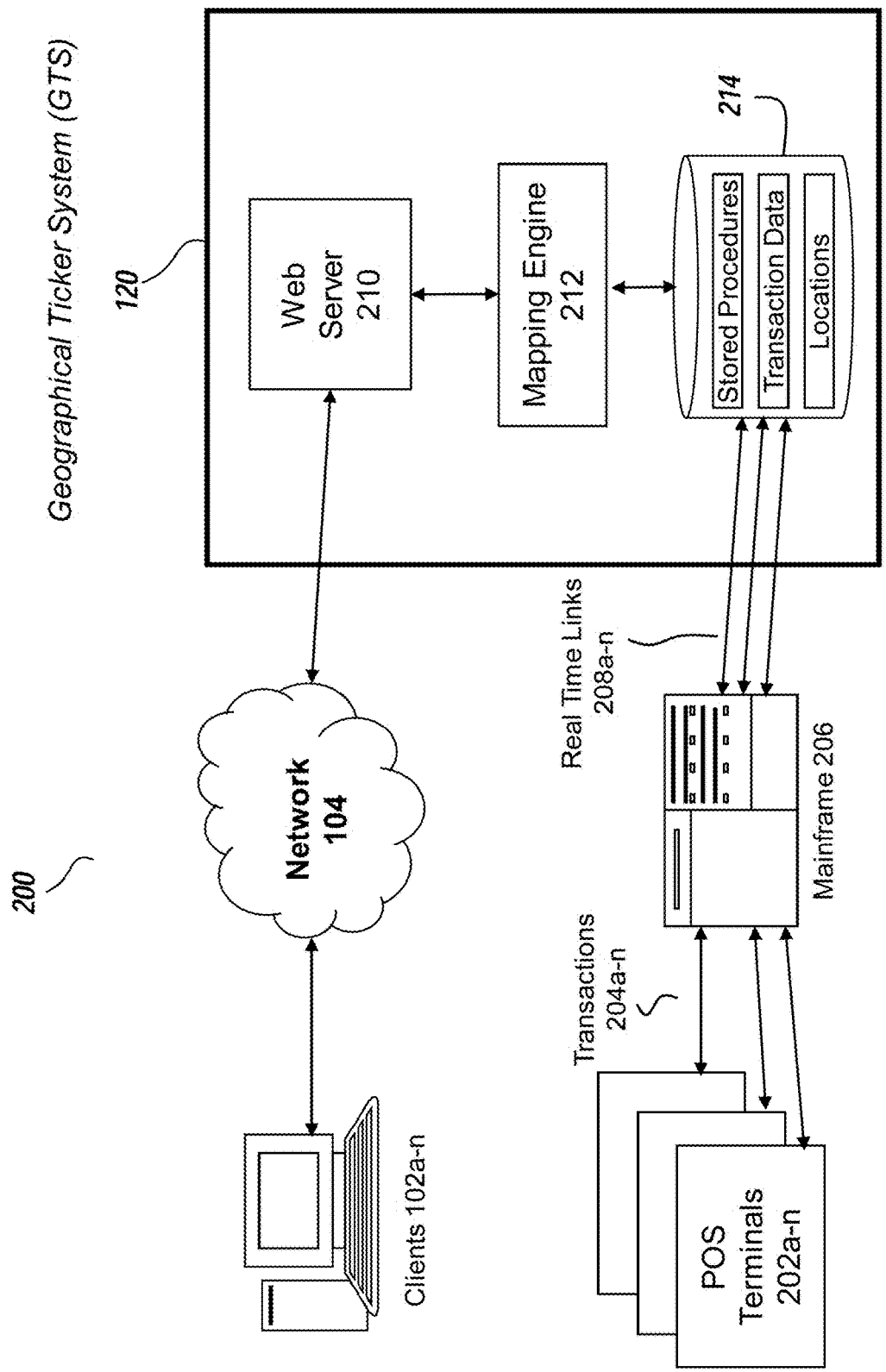
FIG. 2 is a block diagram depicting an embodiment of a system for providing a geographical ticker of financial transactions.

Referring now to FIG. 2, a block diagram depicting an embodiment of a system 200 comprising a geographical ticker system (GTS) is shown. In brief overview, the system 200 includes a geographical ticker system 120 ("GTS") that can receive and/or transmit data via a network 104 and/or links 208a-n (e.g., real time network links). The system 200 may include or interact with one or more clients 102a-n (or client device 102), one or more mainframes 206, and/or one or more point-of-sale (POS) terminals 202a-n (or POS terminal 202). The GTS 120 can include a web server 120 that provides a web page for display on a client device 102 that includes the geographical ticker information. The GTS 120 can include a mapping engine 212 that obtains the transaction data, identifies a location for each transaction, and generates an icon corresponding to the transaction for display on a geographical map. The GTS 120 can include a database 214 or data structure that stores information to facilitate the systems and methods of the present solution, including, e.g., stored procedures, transaction data, and location information. The database 214 (or transaction repository) can obtain transaction data from a mainframe 206 via real time links 208a-n. The mainframe 206 can receive the transaction information via POS terminals 202a-n as the transactions 204a-n occur.

The geographical ticker system 120, web server 210, mapping engine 212, and database 214 may each include one or more processing units or other logic devices such as programmable logic array engines, modules, or circuitry designed and constructed to facilitate managing security on a network infrastructure. The GTS 120 can include the components 100 shown in FIG. 1C or FIG. 1D, or be configured to operate as a service in cloud 108. The GTS can include or interact with one or more servers 106a-n and clients 102a-n.

In some embodiments, the GTS 120 can employ a multitier architecture such as a client-server architecture in which presentation, application processing, and data management functions are logically or physically separated. The presentation tier, or front-end, can include the web server 210 that serves static content or dynamic content to be rendered by the client 102 (e.g., by a web browser executing on client 102). The presentation tier or web server 210 can interact or communicate with the application tier to obtain data to provide to the client 102. The application tier can include the mapping engine 212 that controls the geographical ticker's functionality and performs additional processing or analysis on transaction data. The application tier or mapping engine 212 can interact with the data tier to obtain the transaction data. The data tier can include the data persistence mechanisms (database servers, file shares, etc.) and the data access layer that encapsulates the persistence mechanisms and exposes the data. The data tier can include database 214. The data tier can include an application programming interface (API) to the application tier or mapping engine 212. The database 214 can include stored procedures (e.g., SQL statements) that perform tasks with respect the stored data.

In further detail, and in some embodiments, the GTS 120 includes a mapping engine 212. The mapping engine 212 can execute on one or more processors of a server. The mapping engine 212 can receive or obtain a first set of transaction data from the database 214. The mapping engine 212 may receive this information responsive to a request to generate a geographical ticker. For example, the request may be provide by a client 102 to the web server 210 via network 104. The web server 210 may forward the request or information associated with the request to mapping engine 212. The request may include information about a geographical area, date window, time window, type of FSA, merchant identifiers, or other criteria or parameters that may facilitate generating a geographical ticker. In some implementations, the web server 210 provides a configuration screen in which a user or administrator of GTS 120 can input configuration parameters or constraints used to filter the transaction data. For example, the parameters or constraints may be used to show icons for certain merchants.

The mapping engine 212, using the information in the request, can query the database 214 for transaction data. The mapping engine 212 may generate a query based on the information in the request. For example, the query may include a time window. The time window may include a start time and date, and an end time and date. In some cases, the time window may include a start time and date, and a duration, such as 10 minutes. In some cases, the time window may indicate a time window subsequent to a previous time window with a same duration. Responsive to the query, the mapping engine 212 can receive a first set of transaction data from database 214. The first set of transaction data can include information about transactions that satisfy the query constraints, such as transactions that occurred during the prescribed time window, geographic area, merchant identifiers, etc. Thus, the transaction data can include information for several transactions that occurred during the time window. For each transaction in the transaction data, the mapping engine 212 can receive information identifying a monetary amount of each transaction and an entity at which each transaction occurred. The monetary amount of the transaction may refer to the amount of funds used from a flexible spending account in consideration for goods or services obtained from the entity. The entity can refer to the entity at which a point-of-sale terminal or device used to make the transaction is located or with which the terminal is associated. This information can be included in the first set of transaction data.

In some embodiments, the first set of transaction data can include additional information about each transaction. The additional information can include, for example, an FSA account type, a settlement date of the transaction, a deposit amount made into the FSA account by the employee, an employee's preauthorized balanced, a prefunded amount (e.g., $100/month FSA=$12000 prefunded amount available on January 1), a merchant identifier (e.g., a unique identifier including numbers and letters), a merchant name (e.g., Town A Pharmacy), an adjudication code (e.g., the Internal Revenue Service's view on the transaction), settled code (e.g., status of the transaction, e.g., preauthorized, post authorized, pending, etc.), transaction amount (e.g., in monetary currency such as United States dollars or other currency), transaction adjudication details (e.g., approved, receipt pending, denied, etc.), transaction time and date (e.g., when transaction occurred), entity zip code, transaction adjudication date, etc.

The mapping engine 212 can use the information in the first set of transaction data to identify or obtain a location of each transaction. In some embodiments, the transaction data includes a town and state corresponding to where the transaction occurred. The mapping engine 212 can perform a lookup in a database using the town and state information to identify geographical coordinates (e.g., latitude and longitude) for the transaction. These geographical coordinates may correspond to a predetermined location in the town and state, such as a town center. In some embodiments, the mapping engine 212 can identify a corresponding merchant identifier for each transaction, and perform a lookup in a database to identify a zip code for the merchant. The mapping engine 212 may query the database 214 to identify the location, or may query an external database accessible via network 104. In some embodiments, the first set of transaction data can include a zip code for each transaction, e.g., the zip code of the entity at which the transaction occurred.

In some embodiments, the mapping engine 212 identifies a zip code or town/city and state in which the entity is located based on the entity identifier or entity name. The mapping engine 212 can then query an external database via network 104 to obtain coordinates for the city and state of the entity. The coordinates may include latitude and longitude coordinates. Responsive to this query, the mapping engine 212 may receive coordinates for a predetermined location of the city. The predetermined location may refer to a center of the city or town. The center may refer to the town center as established by governing bodies of the town or the residents of the town. The center may refer to a geographical center of the town. The predetermined location or center may refer to a high density location of the town, high commercial density of the town, high traffic area of the town, focal point of the town, etc.

Figure 4:
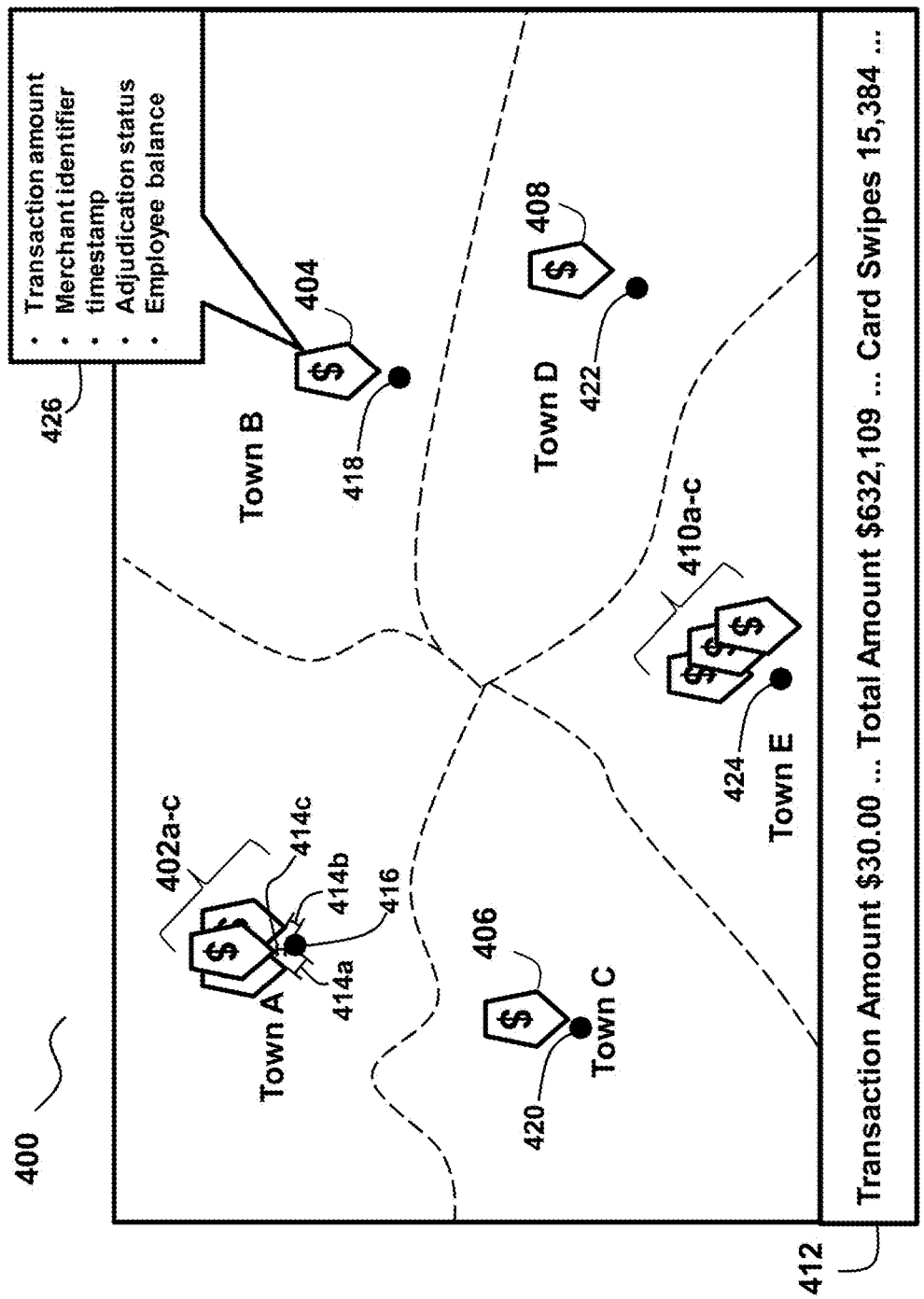
FIG. 4 is a diagram illustrating an embodiment of a geographical ticker.

The mapping engine 212 can generate an icon for each transaction and provide the icon for display on a digital map, as illustrated in digital maps 400 and 401 shown in FIG. 4. The icon may refer to a symbol, shape, character, arrow, or other indication of a transaction. The icon may have attributes such as color, shape, size, opacity, translucency. The attributes of the icon may be set to default attributes, or may selected based on a characteristic of the transaction the icon represents. For example, icon color may vary based on a transaction amount, where transaction amounts greater than $100 are red, transaction amounts between $50-100 are orange, and transaction amounts less than or equal to $50 are green. Icon color may also be set based on merchant name, merchant type, account type, etc. The icon can be configured to provide additional information about the transaction the icon represents. The icon can provide the additional information responsive to a trigger even, such as a user interaction with the icon, or other request for information. For example, the trigger event may refer to a mouse pointer going over the icon, a finger gesture on a touch screen that interacts with the icon, a click on the icon, keeping the mouse over the icon for a time period, or some other interaction with the icon. For example, responsive to the trigger event at the icon, the icon can display an amount of the transaction and an entity identifier corresponding to the entity at which the transaction occurred.

The mapping engine 212 can identify a location for the icon and provide the icon for display at the location on the digital map that corresponds to the location of the entity at which the transaction occurred. This location information can be obtained by the mapping engine in the form of latitude and longitude coordinates. The mapping engine 212, using these coordinates, can provide the icon for display on the digital map (e.g., a geographical vector-based map). The mapping engine 212 may include or generate the digital map, or may interface with a mapping service via network 104 using an application programming interface. The mapping service may include, e.g., BING™ maps provided by MICROSOFT CORPORATION of Redmond, Wash., which is a web mapping service that provides street maps, road views, aerial views, bird's-eye views, street side, and 3D maps. The mapping service may include a collection of first and third party application that can add additional functionality and content to the digital map.

In some embodiments, the GTS 120 can display icons on a digital map via a mapping service using an API such as a Representational State Transfer (REST) interface to perform tasks such as creating a static map with icons or pushpins, geocoding an address, or retrieving imagery metadata. The REST interface may refer to an architectural style that includes a coordinate set of architectural constraints applied to components, connectors and data elements within a distributed hypermedia system.

In some embodiments, the GTS 120 can apply an offset to each location for each transaction in the set of transaction data. The GTS 120 may apply this offset because displaying multiple icons at a same location on the digital map may obfuscate or hide one or more icons at that same location, or make it more difficult for a user of client 102 to select or interact with an icon. Thus, by applying an offset to each location for each transaction, the GTS 120 can facilitate displaying and interacting with all icons for all transactions in the first set of transaction data.

The mapping engine 212 can apply the offset to each location of each transaction. The mapping engine 212 can dynamically generate a random offset. The offset may be a one dimensional offset (e.g., horizontal offset, vertical offset, latitude offset, longitude offset, up offset, down offset). The offset may be a two dimensional offset (e.g., horizontal and vertical offset, latitude and longitude offset, up and down offset). The offset may be a pixel offset, bitmap offset, dimension offset, coordinate offset, distance offset, radius offset, etc. The offset may be generated using a random number generator. The offset may be obtained from a table stored in the database 214 having precomputed offset values.

The offset values may be generated based on a size of the digital map being displayed on the computing device. For example, the offset may computed based on a resolution of the display screen of the client 102 requesting the geographical ticker. For example, an offset distance may be smaller for a display with a high resolution because it may possible to view greater detail in a high resolution display. In another example, the offset may be computed based on the scale of the digital map (e.g., a digital map of a single state, a region of the United States, or the entire United States).

In some embodiments, the offset may have a constant radius from the predetermined location with a varying angle. For example, the predetermined location may be a center point, and the offset icons may form parts of a circle surrounding the predetermined location. Thus, the mapping engine 212 may obtain predetermined or random angular offsets for each location.

Upon identifying an offset amount for a location, the mapping engine 212 can apply the offset to the location. The mapping engine 212 can apply the offset by, e.g., calculating a coordinate or pixel location for the icon based on the offset and the retrieved location for the transaction. The mapping engine 212 can generate or identify a different offset for each transaction, and apply the different offset to each location to generate an offset location for each transaction. The mapping engine 212 can then provide the icon for display on the digital map at the offset location. For example, the mapping engine 212 may provide to a mapping service coordinates representing the offset location and instructions to display the icon at that location. In another example, the mapping engine 212 receives the digital map and then displays the icon at the offset location overlaid on the digital map.

For example, two transactions of the first set of transaction data may have occurred at one or more point of sale terminals located at a same entity. The mapping engine 212 obtains coordinates of the location of the same entity. The mapping engine 212 generates or identifies a first offset and applies the first offset to the coordinates to generate a first offset location for a first transaction of the at least two transactions. The mapping engine 212 then generates or identifies a second offset that is different from the first offset, and applies the second offset to the coordinates to generate a second offset location for a second transaction of the at least two transactions. The mapping engine 212 can display a first icon at the first offset location and a second icon at the second offset location.

In some embodiments, the GTS 120 displays the icons in a time sequence corresponding to the time window. Displaying icons in a time sequence can refer to displaying a first subset of icons for the first set of transaction data at a first time, and a second subset of icons of the first set of transaction data at a second time. The first and second times can correspond to the time window of the first set of transaction data. In some embodiments, the transactions of the first set of transaction data are split over a duration of the time window (e.g., 10 minutes) to display a subset of icons on the digital map during a corresponding display time interval. The corresponding display time interval may be the same as the time window, or less than or greater than the time window. For example, the mapping engine 212 may display 10 minutes worth of transaction data in a one minute display time interval, effectively speeding up the display of the icons.

In some embodiments, the mapping engine 212 displays the first set of transaction data in a time sequence corresponding to time window of the first set of transaction data. However, the icons for each transaction may be normalized in time such that mapping engine evenly displays the icons over the time window. For example, in the first set of transaction data, 80 transactions may have occurred in the first 4 minutes of the time window, and 20 transactions may have occurred in the last 2 minutes of the time window, for a total of 100 transactions. In some embodiments, the mapping engine 212 may display the icons to mimic real-time by displaying the icons in a time sequence corresponding to the timestamps of the transactions. In some embodiments, the mapping engine 212 evenly splits up the 100 transactions such that the icons are displayed in a time sequence corresponding to 10 icons per minute (e.g., number_of_transactions_in_time_interval/display_time_interval (seconds)=number_of_transaction_to_display/second).

The mapping engine 212 can display a stream of icons on the digital map in a time sequence corresponding to the time window. After displaying icons for each transaction in the first set of transaction data, the mapping engine 212 can display icons for subsequent time windows. The mapping engine 212 can obtain a second set of transaction data from the database 214 that includes information about transaction that occurred in a second time window subsequent to the time window. The second, subsequent time window may have the same duration as the previous time window, or a different duration. The mapping engine 212 can generate icons for each transaction in the second set of transaction data and display the icons in a second time sequence corresponding to the second time window.

In some embodiments, the mapping engine 212 can display each icon on the digital map for a predetermined time period and then remove each icon from the digital map upon expiration of the predetermined time period. The predetermined time period may be a preconfigured value or may be dynamically determined based on the duration of the time window. For example, the predetermined time period may be a certain number of seconds or minutes, or be set to be the same as the time window, or a percentage or fraction of the time window (e.g., half the time window, a quarter of the time window, 10% of the time window). The mapping engine 212 may associate a counter or timer with the icon, and start the counter or timer responsive to the icon being displayed. The counter or timer (e.g., countdown timer) can be set to expire based on the predetermined time period.

In some embodiments, one or more icons from two or more time windows or sets of transaction data may be on simultaneous display. For example, if the predetermined time period for a last icon in a first set of transaction data is 1 minute, then this icon may be on display while a first icon of a second set of transaction data is overlaid on the digital map. In another example, if the predetermined time period is 11 minutes, then the last icon in the first set of transaction data may still be on display while a first icon of a third time window corresponding to a third set of transaction data is overlaid on the digital map.

Thus, the mapping engine 212 can remove one or more icons from the digital map. In some embodiments, the mapping engine 212 can remove the icon upon expiration of the predetermined time period. In some embodiments, the mapping engine 212 can remove the icons for a first set of transaction data prior to displaying icons from a subsequent time window, or prior to displaying icons from a second subsequent time window.

In some embodiments, the mapping engine 212 can poll the database 214 based on a time interval or responsive to expiration of a time window. For example, the mapping engine 212 can poll the database 214 when a time window of a set of transaction data expires (e.g., every 10 minutes). In another example, the polling period can be set by a user or administrator of the GTS 120 via a configuration screen. Polling may include pinging or otherwise communicating with the database 214 for a subsequent set of transaction data. The mapping engine 212 can query the database 214 for the subsequent set of transaction data, or otherwise request the subsequent set of transaction data.

In some embodiments, the GTS 120 (e.g., via database 214) can establish one or more real-time communication links 208a-n with a mainframe 206. The mainframe 206 may include a server 106 that is different from the servers of the GTS 120. For example, the mainframe 206 may refer to a mainframe computer produced by INTERNATIONAL BUSINESS MACHINES CORPORATION of Armonk, N.Y., United States. The mainframe 206 may be configured to interface with one or more point of sale devices or terminals 202a-n. The mainframe 206 can receive information about transactions 204a-n as the transactions 204a-n occur via the point of sale terminals 202a-n. Thus, the mainframe 206 can provide a front end that hosts the point of sale terminals 202a-n, and a separate backend server (e.g., a server of database 214) can store the transaction data in database 214.

Each point of sale terminal 202a-n is located at or associated with an entity. The GTS 120 can receive information about transactions 204a-n via mainframe 206 and the real time links 208a-n, and then store the transaction as transaction data in database 214. The transaction data can be stored in a manner that facilitates generating a geographical ticker of transactions. To establish the real time links 208a-n, the GTS 120 may be configured with credentials that facilitate authentication and authorization to access the mainframe 206. The credentials may include, e.g., a username, password, token, encryption, or key, etc.

A point of same terminal 202 is the place where a retail transaction is completed. The POS terminal 202 is the point at which a customer of the entity or merchant makes a payment to the merchant in exchange for goods or services. At the point of sale the merchant may calculate the amount owed by the customer and provide options for the customer to make payment. The merchant may also issue a receipt for the transaction.

The POS terminal 202 can include hardware and software. Merchants may utilize weighing scales, scanners, electronic and manual cash registers, EFTPOS terminals, touch screens and any other wide variety of hardware and software available for use with POS terminal 202. For example, a pharmacy can use software to customize the item or service sold when a customer has a special medication request.

The POS terminal 202 may include advanced features to cater to different functionality, such as inventory management, CRM, financials, warehousing, flexible spending account transactions, etc., all built into the POS software. The point of sale terminal 202 can be configured to conduct a transactions using a debit card, Bluetooth, near field communications, smartphone, smartwatch, mobile telecommunications computing device, wearable communications, RFID, etc.

As the mapping engine 212 polls the database 214 for transaction data, the database 214 stores transaction data received in real-time from point of sale terminals 202. Responsive to polling the database 214, the mapping engine receives a set of transaction data corresponding to the transaction data received in real-time from one or more point of sale terminals 202. The mapping engine 212 may receive the transaction data corresponding to a subsequent time window, or otherwise filter out transaction data from a previous time window for which icons were already displayed. Thus, receiving the transaction data using real time links 208a-n facilitates the GTS 120 displaying icons for transactions in substantially real time.

Figure 3:
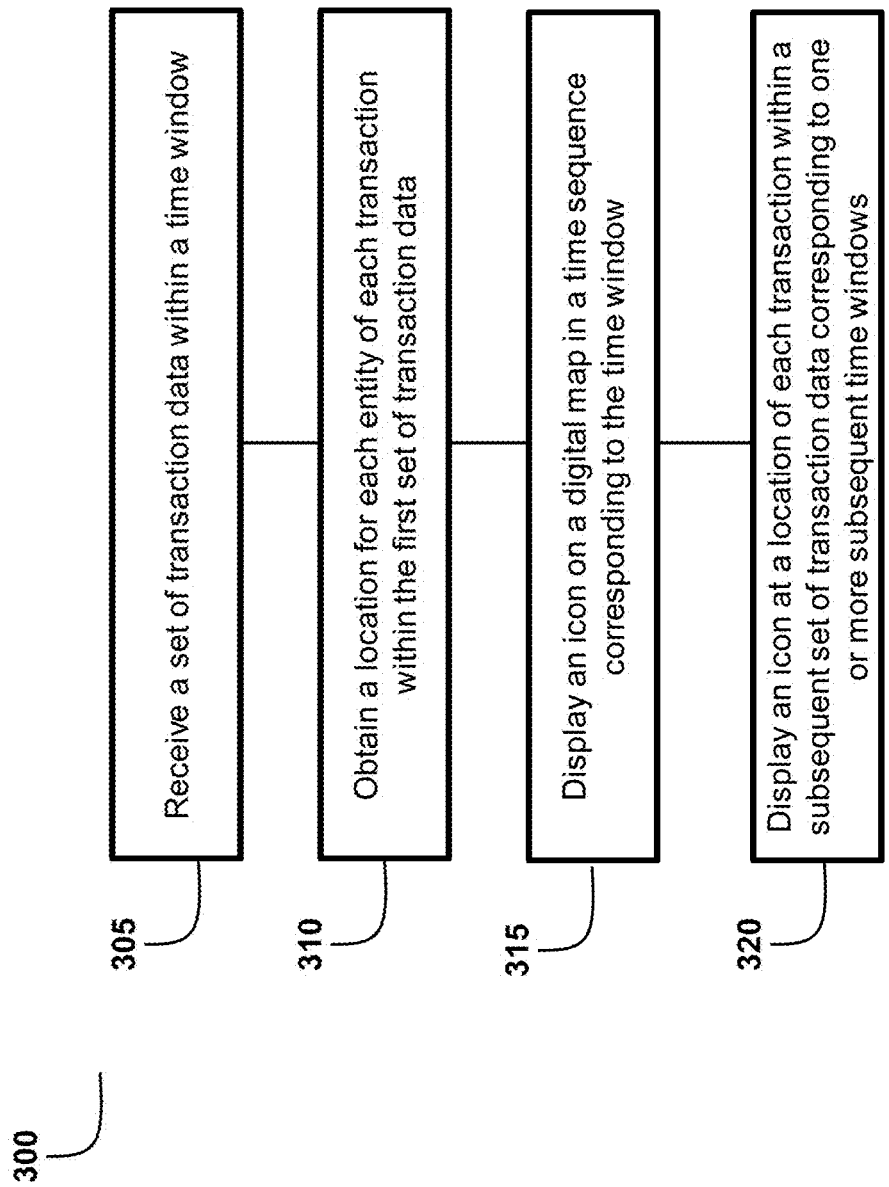
FIG. 3 is flow diagram depicting an embodiment of a method of providing a geographical ticker of financial transactions.

Referring now to FIG. 3, a flow diagram depicting an embodiment of a method of providing a geographical ticker of financial transactions is shown. The method can be performed system 200, GTS 120, or one or more component thereof. In brief overview, at step 305, a mapping (e.g., a mapping engine executing on one or more processors of a server of GTS 120) receives a set of transaction data within a time window. At step 310, the mapping engine can obtain a location for each entity of each transaction within the first set of transaction data. At step 315, the mapping engine displays an icon on a digital map in a time sequence corresponding to the time window. At step 320, the mapping engine can display an icon at a location of each transaction within a subsequent set of transaction data corresponding to one or more subsequent time windows.

Still referring to FIG. 3, and in further detail, at step 305, a mapping (e.g., a mapping engine executing on one or more processors of a server of GTS 120) can receive a set of transaction data within a time window. The mapping engine can receive the transaction data responsive to polling a database based on a polling period, which may be based on a desired time window of the transaction data. The transaction data includes information identifying a monetary amount of a transaction and an entity at which each transaction occurred for several transaction that occurred during the time window. The transactions can refer to transactions made using a tax benefit account such as a flexible spending account. The transaction data may include additional information about the transactions, such as an FSA account type, a settlement date of the transaction, a deposit amount made into the FSA account by the employee, an employee's preauthorized balanced, a prefunded amount (e.g., $100/month FSA=$12000 prefunded amount available on January 1), a merchant identifier (e.g., a unique identifier including numbers and letters, a code), a merchant name (e.g., Town A Pharmacy), an adjudication code (e.g., the Internal Revenue Service's view on the transaction), settled code (e.g., status of the transaction, e.g., preauthorized, post authorized, pending, etc.), transaction amount (e.g., in monetary currency such as United States dollars or other currency), transaction adjudication details (e.g., approved, receipt pending, denied, etc.), transaction time and date (e.g., when transaction occurred), entity town and state, entity zip code, transaction adjudication date, etc.

At step 310, the mapping engine can obtain a location for each entity of each transaction within the first set of transaction data. The mapping engine can obtain the location using the town and state or the zip code in the transaction data or by performing a lookup in a location database using the merchant code or merchant name. The mapping engine can obtain coordinates for the location of the entity at which the transaction occurred, or the mapping engine may obtain coordinates for a predetermined location in a town of the entity. For example, the transaction data may include the town and state or the zip code for the transaction. The mapping engine may identify coordinates for the town and state or the zip code, where the coordinates are for a predetermined location in the town such as a town center. In another example, the mapping engine may obtain a merchant code, and perform a lookup in a database which returns a city and state of the merchant. The mapping engine can use the city and state information to identify coordinates for a predetermined location in the city, such as a center of the city. The center may be the geographical center or an otherwise established town center.

At step 315, the mapping engine can display an icon on a digital map in a time sequence corresponding to the time window. The time sequence can be for the first set of transaction data and refer to a sequence in which the icons for transactions are displayed. The icons may be displayed in chronological sequence, but they may be normalized in time. For example, rather than show the icons in real time during the time window, the icons can be split up evenly across the time window. The order of the transactions may be maintained, but the absolute time stamps may not be maintained. Thus, the mapping engine can display icons in a time sequence as shown in FIGS. 5A-D, while maintained the order, but not in a manner synchronized with real-time. In some embodiments, the mapping engine may generate a time sequence that corresponds to the real-time occurrence of the transactions.

In some embodiments, the mapping engine can apply a dynamic random offset to each location of each transaction, and display the icon at the offset location on the digital map. The dynamic random offset can be different for each transaction location, even if there is only one transaction in at a certain location. The offset can be generated using any technique that facilitates displaying icons at slightly different positions on a digital map such that a user can effectively interact with multiple icons displayed in close proximity to one another.

At step 320, the mapping engine can display an icon at a location of each transaction within a subsequent set of transaction data corresponding to one or more subsequent time windows. For example, the mapping engine can poll a database to obtain a subsequent set of transaction data. To store the transaction in the database, the database or server associated with the database can establish a real-time communication link with a second server (e.g., a mainframe) interfacing with a plurality of point-of-sale devices. The second server can be configured to receive the first and subsequent sets of transaction data in real-time from the plurality of point-of-sale devices. The database can receive the first and subsequent sets of transaction data responsive to the mainframe receiving the first and subsequent sets of transaction data from the plurality of point-of-sale devices.

In some embodiments, the GTS can display additional information about each icon, or can display a ticker of additional information on or adjacent to the digital map. The ticker of additional information may run along the display in accordance with a time sequence or based on some other time period. The ticker may update as each icon is displayed on the digital map. The ticker may update for notable events, such as for icons that exceeds a certain transaction amount; icons for transactions that occurred at a certain entity, or icons for numerically significant card swipes (e.g., every 100 card swipes).

Referring now to FIG. 4, a diagram illustrating an embodiment of a geographical ticker is shown. The digital map 400 shows five towns Town A, Town B, Town C, Town D, and Town E. Each town has a predetermined location shown by respective dots 416, 416, 420, 422, and 424. These predetermined locations may refer to a town center, for example. The GTS 120 (e.g., via mapping engine 212) can display several icons (e.g., 402a-c, 404, 406, 408 and 410a-c) on the digital map 400 that represent transactions. For example, the mapping engine 212 shows three transaction 402a, 402b, and 402c that are located in Town A. Each of these transactions may have occurred at the same entity, or at different entities of the same town. Since the different entities or merchants are located in the same town, and the mapping engine identifies the same predetermined location for all transactions that occurred in a town, these three transactions may map to a same location. However, since displaying three icons at the same coordinates would hide one or more icon or make it more difficult to interact with one or more icons, the mapping engine 212 applies an offset to each location for each transaction. The offsets are shown by offset 414a, offset 414b, and offset 414c. Each of these offsets causes each of icons 402a-c to be displayed on digital map 400 at a location offset from the predetermined location 416 in Town A. Thus, each if icons 402a-c are visible and can be interacted with by a user of a client 102.

When a user interacts with an icon, the GTS 120 can display additional information about the transaction associated with the interacted icon. For example, a user may interact with icon 404 by clicking the icon 404 or moving their mouse pointer over icon 404 to cause a trigger event. Responsive to this trigger event, the GTS 120 can display a pop up window 426 with additional information. For example, pop up window 426 can include a transaction amount, merchant identifier, timestamp of when the transaction occurred, an adjudication status (e.g., whether the transaction was approved as a qualifying transaction per the FSA requirements), or a remaining employee balance in the FSA account.

The GTS 120 can further display, on or adjacent to the digital map 400, additional information associated with the transaction data using a ticker 412. The ticker 412 can continuously display updated information, such as a transaction amount of each new transaction that is being displayed on the digital map 400 in accordance with a time sequence, a total amount of transactions (e.g., for the set of transaction data, or relative to a base transaction amount), and the number of card swipes or transactions (e.g., for the set of transaction data, or relative to a base transaction number). The ticker can be synchronized with the time sequence used to display the transaction data.

In some embodiments, the GTS 120 can provide a configuration screen configured to receive configuration input from a client 102 or administrator of the GTS. The configuration screen can receive input parameters or other information that facilitates generating a geographical ticker and displaying icons on the digital map 400. The configuration screen may include fields, input text boxes, drop-down menus, buttons, or other user interface elements to allow input of configuration parameters.

Configuration parameters may include, e.g., username, password, credentials, polling time period (e.g., in seconds or minutes), total base amount, total transaction base amount, time period for icon (e.g., in seconds or minutes), icon style, map mode (e.g., map service provider, type of view such as aerial, road view, etc.). Configuration parameters may include constraints based on the additional information in the transaction data. These constraints may be used to filter the transaction data to determine which transactions to display on the digital map 400. For example, a user may filter the transaction data based on type of FSA account, merchant ID or merchant name, transaction amount, adjudicated status, merchant codes, FSA administrators, point of sale terminal identifiers, etc. Thus, the GTS 120 may only display icons for transactions that satisfy the constraints.

FIGS. 5A-5D are diagrams illustrating displaying icons in a time sequence in accordance with an embodiment. The time sequence can begin in FIG. 5A with digital map 500. This time sequence may correspond to a 600 second time sequence that is split up into four 150 second intervals, where each of FIGS. 5A-5D correspond to a 150 second time intervals 500, 501, 502 and 503.

Figure 5A:
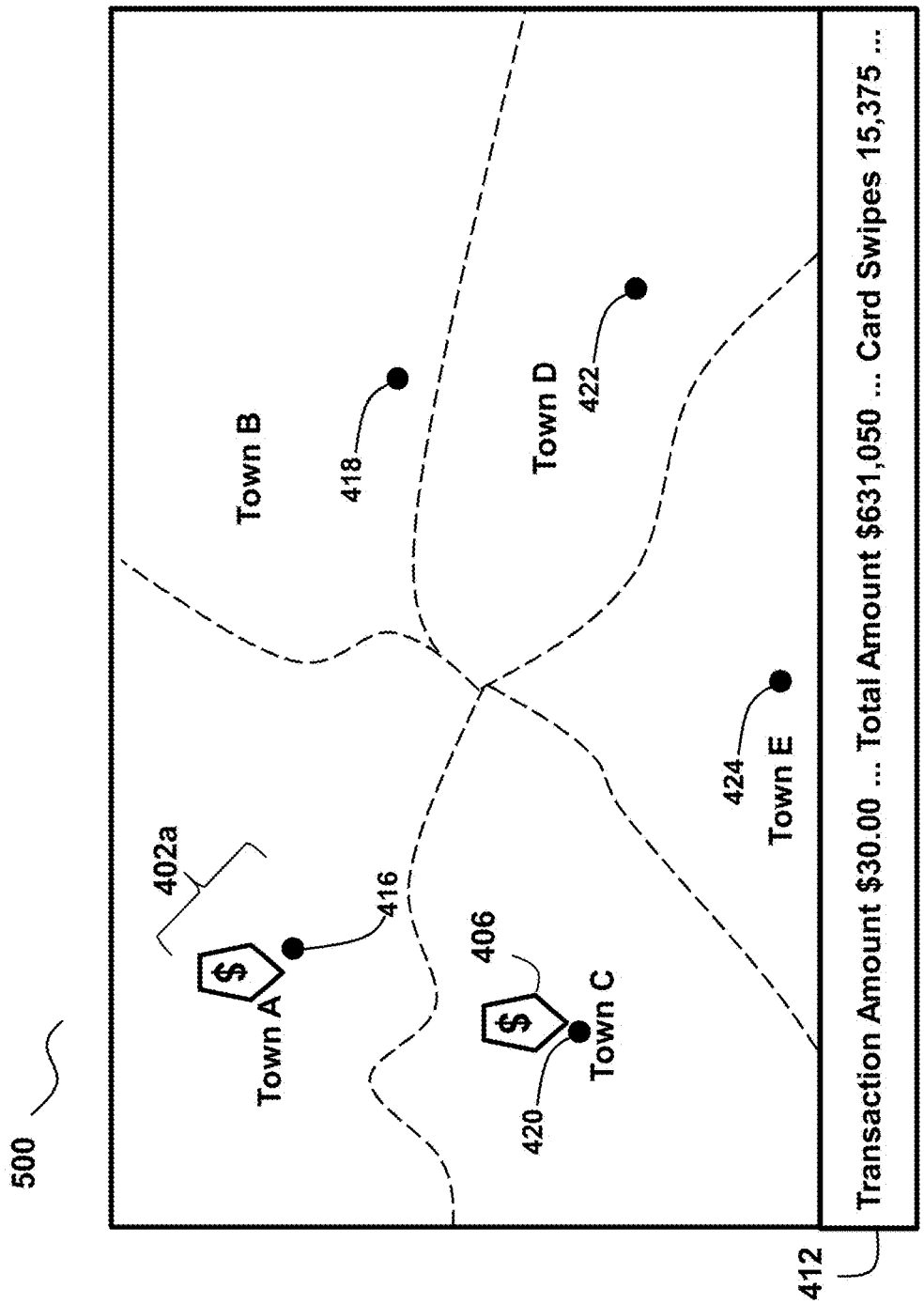
FIGS. 5A-5D are diagrams illustrating displaying icons in a time sequence in accordance with an embodiment.
Figure 5B:
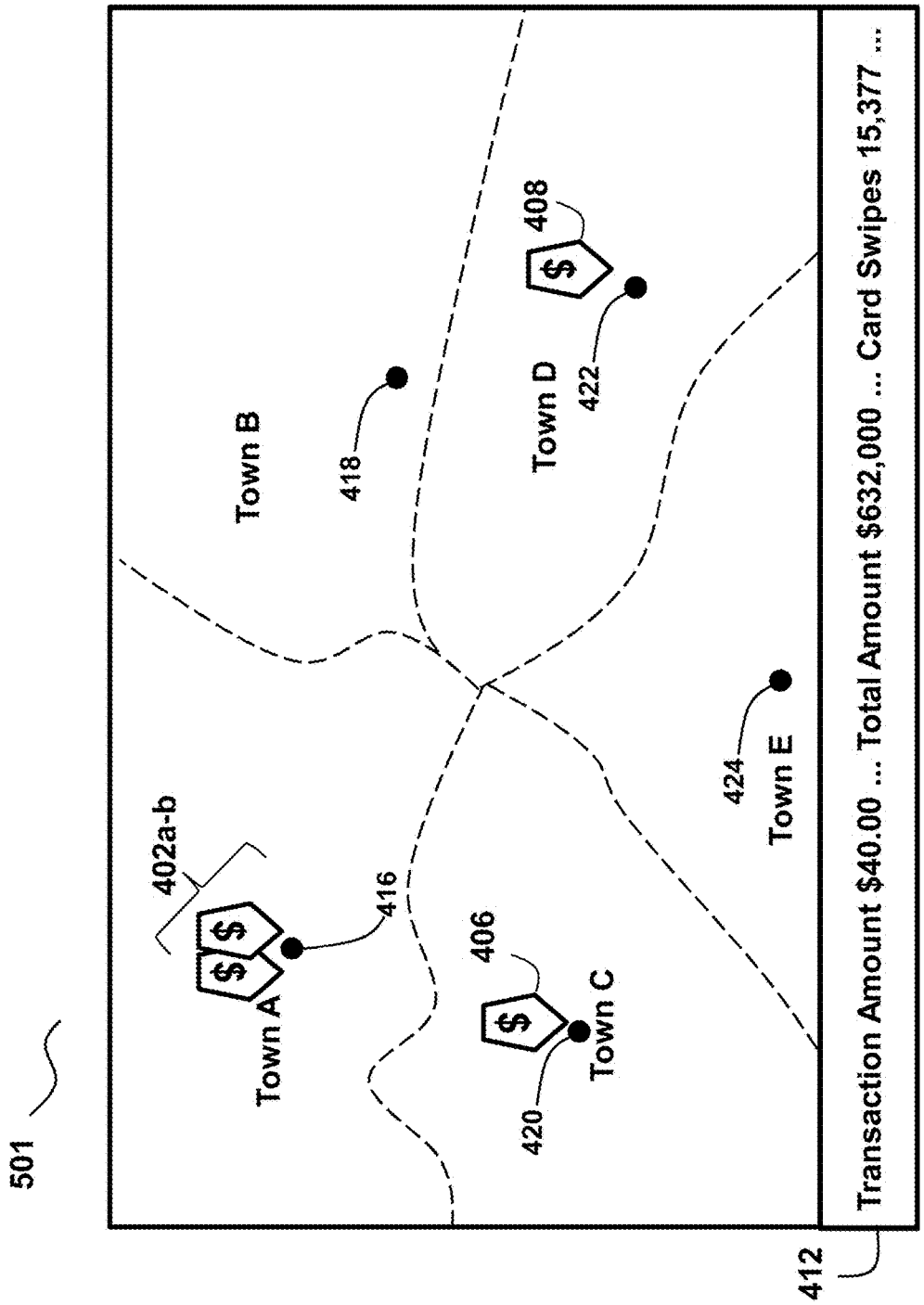

In the first time interval 500 shown in FIG. 5A, icon 402a and icon 406 are displayed. The transaction amount is $30, the total transaction amount is 631,050 and the number of card swipes is 15,375. In the second time interval 501 shown in FIG. 5B, icon 402a-b, icon 406, and icon 408 are displayed. The transaction amount is $40 for the last icon displayed (e.g., 408), the total transaction amount is 631,090 and the number of card swipes is 15,377.

Figure 5C:
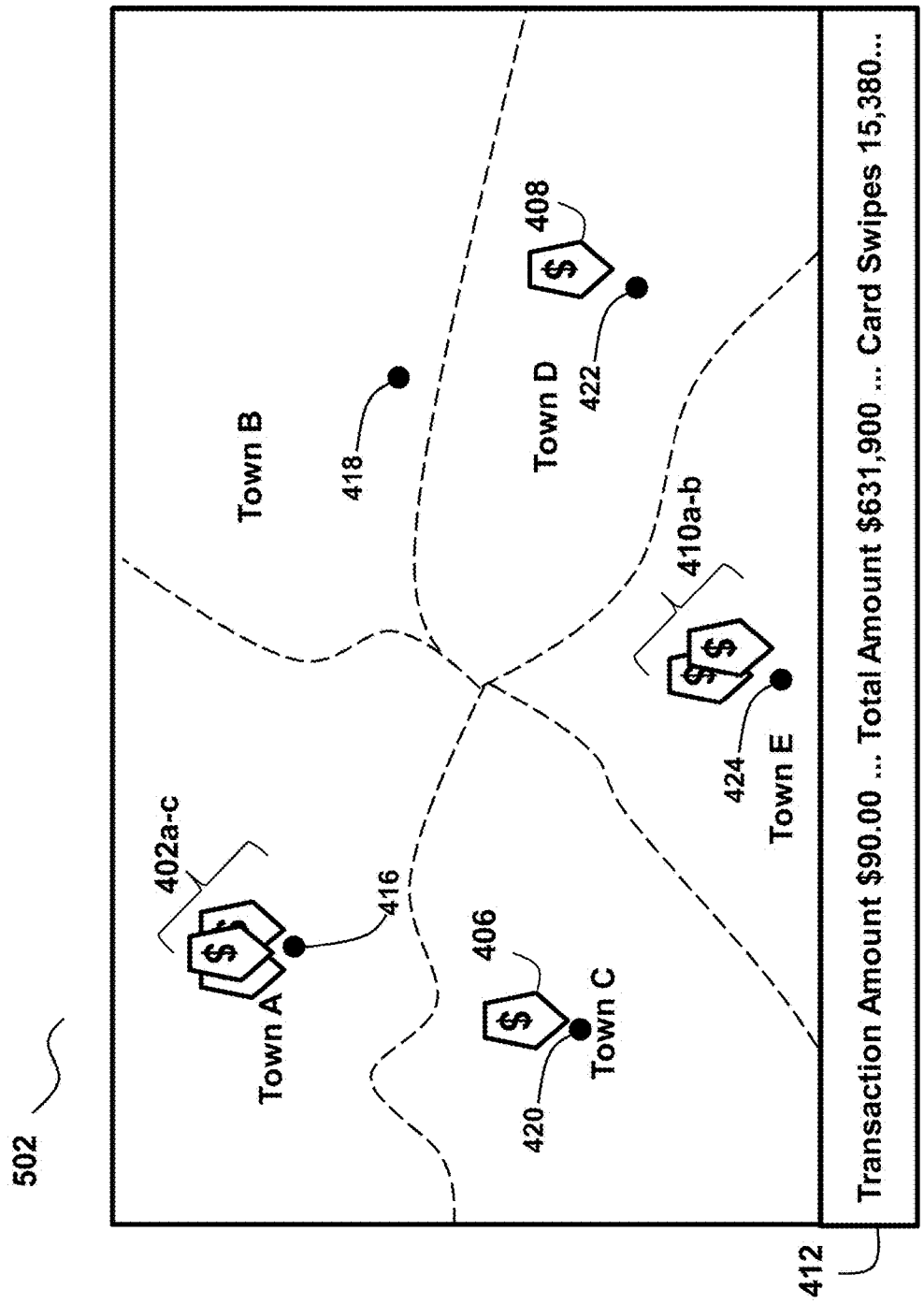

In the third time interval 502 shown in FIG. 5C, icon 402a-c, icon 406, icon 408 and icons 410a-b are displayed. The transaction amount is $90 for the last icon displayed (e.g., 410b), the total transaction amount is 631,900 and the number of card swipes is 15,380.

Figure 5D:
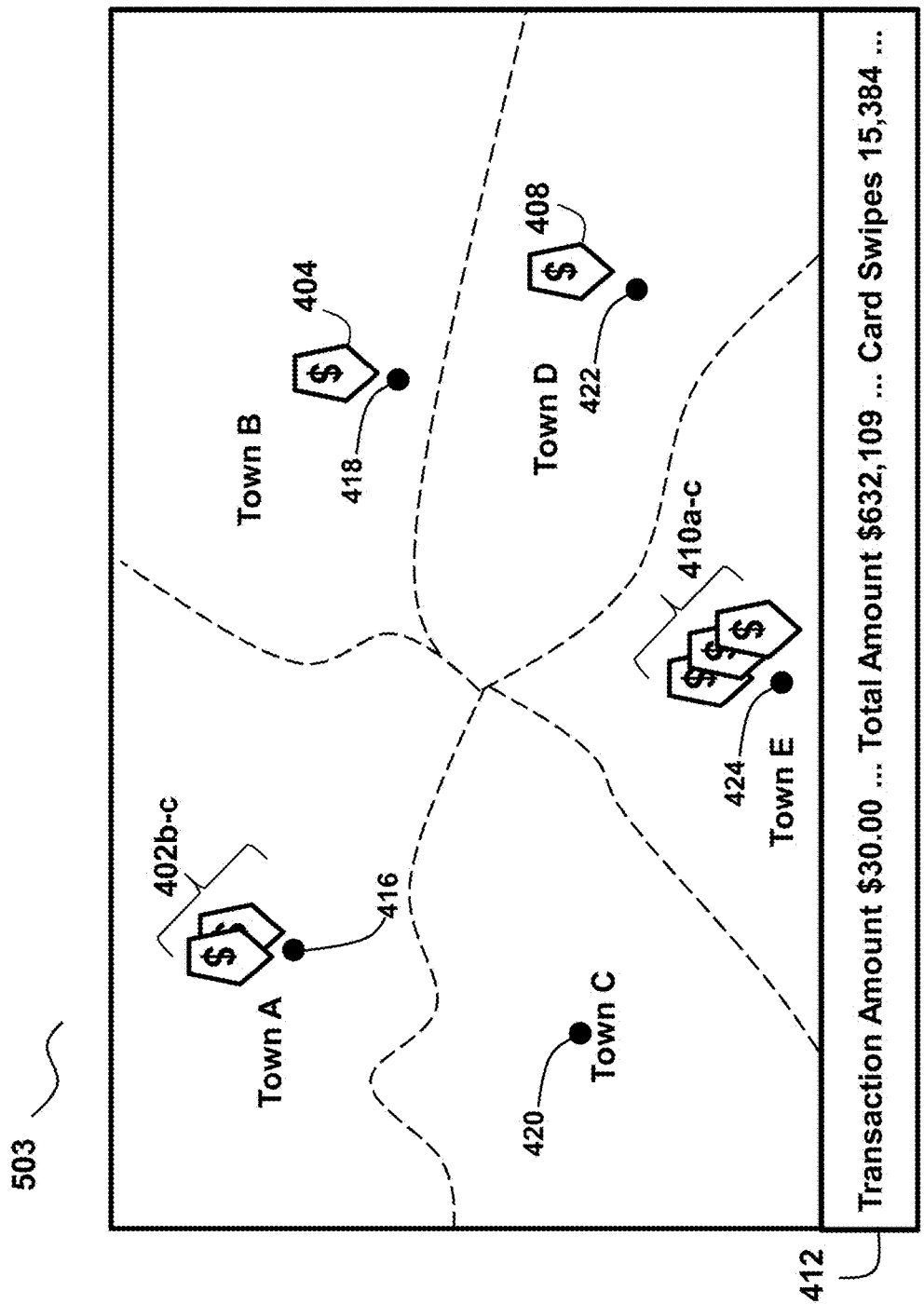

In the fourth and final time interval 503 of the first set of transaction data shown in FIG. 5D, icon 402b-c, icon 404, icon 408 and icons 410a-c are displayed. The transaction amount is $30 for the last icon displayed (e.g., 404), the total transaction amount is 632,109 and the number of card swipes is 15,384. However, the mapping engine has removed icons 402a and 406 because a time period for displaying those icons expired (e.g., a time period of 400 seconds).

In some embodiments, FIGS. 5A-5D may refer to a time sequence of one set of transaction data. In some embodiments, FIGS. 5B-5D may represent three sets of transaction data subsequent to a first set of transaction displayed in FIG. 5A.

While the invention has been particularly shown and described with reference to specific embodiments, it should be understood by those skilled in the art that various changes in form and detail may be made therein without departing from the spirit and scope of the invention described in this disclosure.

What is claimed is:

1. A method of providing a geographical ticker of financial transactions, the method comprising:

receiving, by a mapping engine executing on a server comprising at least one processor, from a database, a first set of transaction data within a first predetermined time window responsive to a request from a client device, the first set of transaction data comprising information identifying a monetary amount of a transaction and an entity at which each transaction occurred for a plurality of transactions that occurred during the first predetermined time window;

obtaining, by the mapping engine, a set of geographical coordinates corresponding to each location of the entity for each transaction within the first set of transaction data, wherein at least two transactions of the plurality of transactions occurred, during the first predetermined time window, at a same location of a same entity corresponding to same geographical coordinates;

selecting, by the mapping engine for the first predetermined time window, an offset technique comprising a one dimensional offset or a two dimensional offset to prevent obfuscation of icons associated with same location transactions within the first predetermined time window;

generating, by the mapping engine using the selected offset technique configured to prevent the obfuscation of icons associated during the first predetermined time window, a different offset for each location for each transaction of the first set of transaction data;

applying, by the mapping engine, the different offset to each location for each transaction of the first set of transaction data in the first predetermined time window;

determining, by the mapping engine based on a display time interval and a number of transactions in the first set of transaction data, a display rate for the first predetermined time window to evenly display the icons of the first predetermined time window during the display time interval;

splitting, by the mapping engine based on the display rate, the icons to generate a first time sequence configured to evenly display the icons of the first predetermined time window;

displaying, by the mapping engine, a digital map on the client device via a web server connection;

displaying, by the mapping engine on the digital map and in the first time sequence corresponding to the first predetermined time window, a separate icon split based on the display rate to provide an even display of the icons at each different offset location for each transaction within the first set of transaction data; and displaying, by the mapping engine on the digital map and in one or more time sequences corresponding to one or more predetermined time windows subsequent to the first predetermined time window, an icon at each location for each transaction within one or more sets of transaction data corresponding to the one or more predetermined time windows.

2. The method of claim 1, further comprising:
polling, by the mapping engine, the database responsive to expiration of the first predetermined time window; and
receiving, by the mapping engine responsive to the polling, a second set of transaction data within a second predetermined time window subsequent to the first predetermined time window.

3. The method of claim 1, further comprising:
displaying each icon for a predetermined time period and removing each icon from the digital map upon expiration of the predetermined time period.

4. The method of claim 1, wherein the first set of transaction data further comprises information identifying the monetary amount of each transaction and the entity of each transaction made at a corresponding plurality of point-of-sale devices using funds from one or more flexible spending accounts.

5. The method of claim 1, wherein at least two transactions of the first set of transaction data occurred via a same entity, the method comprising:
obtaining, by the mapping engine, coordinates of a location of the same entity;
applying, by the mapping engine, a first offset to the coordinates to generate a first offset location for a first transaction of the at least two transactions;
applying, by the mapping engine, a second offset to the coordinates to generate a second offset location for a second transaction of the at least two transactions, the second offset location different from the first offset location; and
displaying, by the mapping engine in the first time sequence corresponding to the first predetermined time window, a first icon at the first offset location and a second icon at the second offset location.

6. The method of claim 1, wherein obtaining each location of the entity comprises:

obtaining coordinates of a predetermined location within a city.

7. The method of claim 1, wherein the icon is configured to display, responsive to a trigger event, the monetary amount of the transaction and an identifier of the entity at which the transaction occurred.

8. The method of claim 1, further comprising:
establishing, by the server, a real-time communication link with a second server interfacing with a plurality of point-of-sale devices, the second server configured to receive the first set of transaction data in real-time from the plurality of point-of-sale devices;
receiving, by the server, the first set of transaction data responsive to the second server receiving the first set of transaction data from the plurality of point-of-sale devices; and
storing, by the server, the first set of transaction data in the database.

9. The method of claim 1, further comprising:
displaying on or adjacent to the digital map a running total of the monetary amount of each transaction of the first set of transaction data.

10. The method of claim 1, further comprising:
receiving, via a configuration screen, a base total monetary amount and a base total number of transactions;
displaying on or adjacent to the digital map a running total of the monetary amount of each transaction of the first set of transaction data relative to the base total amount; and
displaying on or adjacent to the digital map a transaction number corresponding to the running total, the transaction number relative to the base total number of transactions.

11. The system of claim 10, wherein at least two transactions of the first set of transaction data occurred via a same entity, and wherein the mapping engine is further configured to:
obtain coordinates of a location of the same entity;
apply a first offset to the coordinates to generate a first offset location for a first transaction of the at least two transactions;
apply a second offset to the coordinates to generate a second offset location for a second transaction of the at least two transactions, the second offset location different from the first offset location; and
display, in the first time sequence corresponding to the first predetermined time window, a first icon at the first offset location and a second icon at the second offset location.

12. A system that provides a geographical ticker of financial transactions, the system comprising:
a mapping engine executing on a server comprising at least one processor configured to:
receive, from a database, a first set of transaction data within a first predetermined time window responsive to a request from a client device, the first set of transaction data comprising information identifying a monetary amount of a transaction and an entity at which each transaction occurred for a plurality of transactions that occurred during the first predetermined time window;
obtain a set of geographical coordinates corresponding to each location of the entity for each transaction within the first set of transaction data, wherein at least two transactions of the plurality of transactions occurred, during the first predetermined time window, at a same location of a same entity corresponding to same geographical coordinates;

select, for the first predetermined time window, an offset technique comprising a one dimensional offset or a two dimensional offset to prevent obfuscation of icons associated with same location transactions within the first predetermined window;

generate, using the selected offset technique configured to prevent the obfuscation of icons associated during the first predetermined time window, a different offset for each location for each transaction of the first set of transaction data;

apply the different offset to each location for each transaction of the first set of transaction data in the first predetermined time window;

determine, based on a display time interval and a number of transactions in the first set of transaction data, a display rate for the first predetermined time window to evenly display the icons of the first predetermined time window during the display time interval:

split, based on the display rate, the icons to generate a first time sequence configured to evenly display the icons of the first predetermined time window;

display a digital map on the client device via a web server connection;

display, on the digital map and in a first time sequence corresponding to the first predetermined time window, a separate icon split based on the display rate to provide an even display of the icons at each different offset location for each transaction within the first set of transaction data; and display, on the digital map and in one or more time sequences corresponding to one or more predetermined time windows subsequent to the first predetermined time window, an icon at each location for each transaction within one or more sets of transaction data corresponding to the one or more predetermined time windows.

13. The system of claim 12, wherein the mapping engine is further configured to:

poll the database responsive to the first predetermined time window ending; and receive, responsive to the polling, a second set of transaction data within a second predetermined time window subsequent to the first predetermined time window.

14. The system of claim 12, wherein the mapping engine is further configured to:

display each icon for a predetermined time period and remove each icon from the digital map upon expiration of the predetermined time period.

15. The system of claim 12, wherein the first set of transaction data further comprises information identifying the monetary amount of each transaction and the entity of each transaction made at a corresponding plurality of point-of-sale devices using funds from one or more flexible spending accounts.

16. The system of claim 12, wherein the server is further configured to:

establish a real-time communication link with a second server interfacing with a plurality of point-of-sale devices, the second server configured to receive the first set of transaction data in real-time from the plurality of point-of-sale devices;

receive the first set of transaction data responsive to the second server receiving the first set of transaction data from the plurality of point-of-sale devices; and store the first set of transaction data in the database.

17. The system of claim 12, wherein the mapping engine is further configured to:

display on or adjacent to the digital map a running total of the monetary amount of each transaction of the first set of transaction data.

18. The system of claim 12, wherein the server is further configured to:

receive, via a configuration screen, a base total monetary amount and a base total number of transactions;

display on or adjacent to the digital map a running total of the monetary amount of each transaction of the first set of transaction data relative to the base total amount; and display on or adjacent to the digital map a transaction number corresponding to the running total, the transaction number relative to the base total number of transactions.

* * * * *